(12) United States Patent
Garcia et al.

(10) Patent No.: US 9,771,264 B2
(45) Date of Patent: Sep. 26, 2017

(54) CONTROLLED-ORIENTATION FILMS AND NANOCOMPOSITES INCLUDING NANOTUBES OR OTHER NANOSTRUCTURES

(75) Inventors: Enrique J. Garcia, Zaragoza (ES); Anastasios John Hart, Cambridge, MA (US); Diego S. Saito, Tupa (BR); Brian L. Wardle, Lexington, MA (US); Hulya Cebeci, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1311 days.

(21) Appl. No.: 12/618,203

(22) Filed: Nov. 13, 2009

(65) Prior Publication Data

US 2010/0196695 A1 Aug. 5, 2010

Related U.S. Application Data

(63) Continuation-in-part of application No. 11/586,310, filed on Oct. 25, 2006, now Pat. No. 8,372,470.
(Continued)

(51) Int. Cl.
*B32B 5/16* (2006.01)
*B29C 43/02* (2006.01)
(Continued)

(52) U.S. Cl.
CPC ............ *C01B 31/022* (2013.01); *B82Y 30/00* (2013.01); *B82Y 40/00* (2013.01); *D01F 9/127* (2013.01);
(Continued)

(58) Field of Classification Search
CPC .......................... C01B 2202/08; C01B 31/022
(Continued)

(56) References Cited

U.S. PATENT DOCUMENTS 4,560,603 A 12/1985 Giacomel
4,770,926 A 9/1988 Yamamura et al.
(Continued)

FOREIGN PATENT DOCUMENTS

EP 1 489 630 A1 12/2004
EP 1 652 573 A1 5/2006
(Continued)

OTHER PUBLICATIONS

Ajayan, P.M., et al., "Nanotube composites," *Nature*, 2007, 447(28), 1066-1068.
(Continued)

*Primary Examiner* — Jennifer Chriss
*Assistant Examiner* — Camie Thompson
(74) *Attorney, Agent, or Firm* — Wolf, Greenfield & Sacks, P.C.

(57) ABSTRACT

Generally, the present invention provides methods for the production of materials comprising a plurality of nanostructures such as nanotubes (e.g., carbon nanotubes) and related articles. The plurality of nanostructures may be provided such that their long axes are substantially aligned and, in some cases, continuous from end to end of the sample. For example, in some cases, the nanostructures may be fabricated by uniformly growing the nanostructures on the surface of a substrate, such that the long axes are aligned and non-parallel to the substrate surface. The nanostructures may be, in some instances, substantially perpendicular to the substrate surface. In one set of embodiments, a force with a component normal to the long axes of the nanostructures may be applied to the substantially aligned nanostructures. The application of a force may result in a material comprising a relatively high volume fraction or mass density of nanostructures. In some instances, the application of a force may result in a material comprising relatively closely-spaced
(Continued)

nanostructures. The materials described herein may be further processed for use in various applications, such as composite materials (e.g., nanocomposites). For example, a set of aligned nanostructures may be formed, and, after the application of a force, transferred, either in bulk or to another surface, and combined with another material (e.g., to form a nanocomposite) to enhance the properties of the material.

32 Claims, 12 Drawing Sheets

Related U.S. Application Data

(60) Provisional application No. 60/729,881, filed on Oct. 25, 2005, provisional application No. 61/114,967, filed on Nov. 14, 2008.

(51) Int. Cl.

| | |
|---|---|
| B29C 71/02 | (2006.01) |
| B05D 3/12 | (2006.01) |
| B05D 3/02 | (2006.01) |
| B32B 38/10 | (2006.01) |
| C01B 31/02 | (2006.01) |
| B82Y 30/00 | (2011.01) |
| B82Y 40/00 | (2011.01) |
| D01F 9/127 | (2006.01) |

(52) U.S. Cl.
CPC ...... C01B 2202/08 (2013.01); C01B 2202/36 (2013.01); Y10T 156/1111 (2015.01); Y10T 428/25 (2015.01)

(58) Field of Classification Search
USPC ........................................................ 977/762
See application file for complete search history.

(56) References Cited

U.S. PATENT DOCUMENTS

| | | | |
|---|---|---|---|
| 4,892,693 | A | 1/1990 | Perrotta et al. |
| 5,821,537 | A | 10/1998 | Ishihara et al. |
| 6,265,333 | B1 | 7/2001 | Dzenis et al. |
| 6,297,063 | B1 | 10/2001 | Brown et al. |
| 6,420,293 | B1 | 7/2002 | Chang et al. |
| 6,673,392 | B2 | 1/2004 | Lee et al. |
| 7,160,531 | B1 | 1/2007 | Jacques et al. |
| 7,323,157 | B2 | 1/2008 | Kinloch et al. |
| 7,537,825 | B1 | 5/2009 | Wardle et al. |
| 7,718,223 | B1 | 5/2010 | Delzeit et al. |
| 2003/0012721 | A1 | 1/2003 | Nakayama et al. |
| 2003/0231471 | A1 | 12/2003 | De Lorenzo et al. |
| 2004/0053440 | A1 | 3/2004 | Lai et al. |
| 2004/0071870 | A1 | 4/2004 | Knowles et al. |
| 2004/0265210 | A1 | 12/2004 | Shinohara et al. |
| 2005/0081983 | A1 | 4/2005 | Nakayama et al. |
| 2005/0116336 | A1* | 6/2005 | Chopra et al. ........... 257/720 |
| 2005/0152826 | A1 | 7/2005 | Shatwell |
| 2005/0167647 | A1 | 8/2005 | Huang et al. |
| 2005/0170089 | A1 | 8/2005 | Lashmore et al. |
| 2005/0207965 | A1 | 9/2005 | Shimoyama et al. |
| 2006/0073089 | A1 | 4/2006 | Ajayan et al. |
| 2006/0252853 | A1 | 11/2006 | Ajayan et al. |
| 2007/0092431 | A1 | 4/2007 | Resasco et al. |
| 2007/0128960 | A1 | 6/2007 | Ghasemi Nejhad et al. |
| 2008/0075954 | A1 | 3/2008 | Wardle et al. |
| 2008/0187648 | A1 | 8/2008 | Hart et al. |
| 2008/0292835 | A1 | 11/2008 | Pan et al. |
| 2010/0255303 | A1* | 10/2010 | Wardle et al. ........... 428/378 |

FOREIGN PATENT DOCUMENTS

| | | |
|---|---|---|
| JP | 17022141 A | 1/2005 |
| JP | 2005022141 | 1/2005 |
| JP | 2005200676 | 7/2005 |
| WO | WO 2005/028549 A2 | 3/2005 |
| WO | WO 2007/136755 A2 | 11/2007 |
| WO | WO 2008/054541 A2 | 5/2008 |
| WO | WO 2008/097275 A2 | 8/2008 |
| WO | WO 2009/029218 A2 | 3/2009 |

OTHER PUBLICATIONS

Barber, A.H., et al., "Measurement of Carbon Nanotube-Polymer Interfacial Strength," *Applied Physics Letters*, 2003, 82(23), 4140-4142.

Bazilevsky, A.V., et al., "Selective Intercalation of Polymers in Carbon Nanotubes," *Langmuir*, 2007, 23, 7451-7455.

Bennett, R.D., "Controlling the Morphology of Carbon Nanotube Films by Varying the Areal Density of Catalyst Nanoclusters Using Block Copolymer Micellar Thin Films," *Advanced Materials*, 2006, 2274-2279.

Bennett, R.D., et al., "Using Block Copolymer Micellar Thin Films as Templates for the Production of Catalysts for Carbon Nanotube Growth," *Chemistry of Materials*, 2004, 16(26), 5589-5598.

Bennett, R.D., et al., "Creating Patterned Carbon Nanotube Catalysts through the Microcontact Printing of Block Copolymer Micellar Thin Films," *Langmuir*, 2006, 22(20), 8273-8276.

Boskovic, B.O., et al., "Low Temperature Synthesis of Carbon Nanofibres on Carbon Fibre Matrices," *Carbon*, 43, 2643-2648, 2005.

"Bucky-Paper Systems for Treatment of Acute Wounds," *Nanotech Briefs*, Oct. 2005, 2(7), 14-15.

Breuer, O., et al., "Big Returns From Small Fibers: A Review of Polymer/Carbon Nanotube Composites," *Polymer Composites*, 2004, 25(6), 630-645.

Cao, A., et al., "Multifunctional Brushes Made From Carbon Nanotubes," *Nature Materials*, 2005, 4, 540-545.

Chakrapani, N., et al., "Capillarity-driven assembly of two-dimensional cellular carbon nanotube foams," *Proc. of the Nat. Academy of Science*, 2004, 101(12), 4009-4012.

Ci, L.J., et al., "Direct Growth of Carbon Nanotubes on the Surface of Ceramic Fibers," *Carbon*, 2005, 43(4), 883-886.

Cooper, C.A., et al., "Detachment of Nanotubes from a Polymer Matrix," *Applied Physics Letter*, 2002, 81(20), 3873-3875.

Coleman, J.N. et al., "Improving the Mechanical Properties of Single-Walled Carbon Nanotube Sheets by Intercalation of Polymeric Adhesives," *Applied Physics Letters*, 2003, 82(11), 1682-1684.

Coleman, J.N. et al., "High-Performance Nanotube-Reinforced Plastics: Understanding the Mechanism of Strength Increase," *Advanced Functional Materials*, 2004, 14(8), 791-798.

Coleman, J.N., et al., "Small but strong: A review of the mechanical properties of carbon nanotube-polymer composites," *Carbon*, 2006, 44, 1-29.

Coleman, J.N., et al., "Reinforcement of polymers with carbon nanotubes. The role of an ordered polymer interfacial region. Experiment and modeling," *Polymer*, 2006, 47, 8556-8561.

Dalton, A.B., et al., "Continuous carbon nanotube composite fibers: properties, potential applications, and problems," *J. Mater. Chem.*, 2004, 14, 1-3.

Dresselhaus, M.S. et al., "Raman spectroscopy on one isloated carbon nanotube," *Physica B.: Condens. Matter*, 2002, 323, 15-20.

Dror, Y. et al., "From carbon nanotube dispersion to composite nanofibers," *Progr. Colloid Polym. Sci.*, 2005, 130, 64-69.

Du, F.M., "Effect of Nanotube Alignment on Percolation Conductivity in Carbon Nanotube/Polymer Composites," *Physical Review B*, 2005, 72(12), 4 pages.

Dujardin, E., et al. "Capillarity and Wetting of Carbon Nanotubes," *Science*, 1994, 265(5180), 1850-1852.

Duong, H.M., et al., "Computational modeling of the thermal conductivity of single-walled carbon nanotube-polymer composites," *Nanotech*, 2008, 19, 065702 (8 pages).

(56) References Cited

OTHER PUBLICATIONS

Endo, M., et al., "Atomic Nanotube Welders: Boron Interstitials Triggering Connections in Double-Walled Carbon Nanotubes," *Nano Letters*, 2005, 5(6), 1099-1105.

Ericson, L.M., et al., "Macroscopic, Neat, Single-Walled Carbon Nanotube Fibers," *Science*, 2004, 305, 1447-1450.

Fan, S.S., et al., "Self-Oriented Regular Arrays of Carbon Nanotubes and Their Field Emission Properties," *Science*, 1999, 283(5401), 512-514.

Fang, W., et al., "Polymer-Reinforced, Aligned Multiwalled Carbon Nanotube Composites for Microelectromechanical Systems and Applications," *Adv. Mater.*, 2005, 17, 2987-2992.

Futaba, D.N., et al. "Shape-engineerable and highly densely packed single-walled carbon nanotubes and their application as super capacitor electrodes," *Nat. Mater.*, 2006, 5, 987-994.

Garcia, E.J., et al., "Fabrication of Composite Microstructures by Capillarity-Driven Wetting of Aligned Carbon Nanotubes with Polymers," *Nanotech.*, 2007, 18, 165602 (11 pages).

Garcia, E.J., et al., "Fabrication and Nanocompression Testing of Aligned Carbon-Nanotube-Polymer Nanocomposites," *Adv. Mater.*, 2007, 19, 2151-2156.

Garcia, E.J., et al., "Aligned Carbon Nanotube Reinforcements of Graphite/Epoxy Ply Interfaces," *Proc. of the 16th Int. Conf. on Composite Material (ICCM)*, Kyoto Japan, Jul. 8-13, 2007.

Garcia, E.J., et al., "Fabrication and Multifunctional Properties of High Volume Fraction Aligned Carbon Nanotube Thermoset Composites," *JNST*, 2009, 1(1), 1-11.

Garcia, E.J., et al., "(Student Paper) Fabrication and Testing of Long Carbon Nanotubes Grown on the Surface of Fibers for Hybrid Composites," presented at the 47th AIAA/ASME/ASCE/AJS/ASC Structures, Structural Dynamics, and Materials Conference, Newport, R.I., May 1-4, 2006.

Gorga, R.E., et al., "The Importance of Interfacial Design at the Carbon Nanotube/Polymer Composite Interface," *J. Appl. Polym. Sci.*, 2006, 102, 1413-1418.

Guzman De Villoria, R., et al., "Mechanical properties of SWNT/epoxy composites using two different curing cycles," *Composites Part B*, 2006, 37, 273-277.

Guzman De Villoria, R., et al., "Mechanical model to evaluate the effect of the dispersion in nanocoposites," *Acta Mater.*, 2007, 55, 3025-3031.

Hart, A.J., et al., "Desktop Growth of Carbon-Nanotube Monoliths with In Situ Optical Imaging," *Small Journal*, 2007, 3(5), 772-777.

Hart, A.J., et al., "Rapid Growth and Flow-Mediated Nucleation of Millimeter-Scale Aligned Carbon Nanotube Structures From Thin-Film Catalyst," *Journal of Physical Chemistry B*, 2006, 110, 8250-8257.

Hart, A.J., et al., "Growth of Conformal Single-Walled Carbon Nanotube Films from Mo/Fe/$Al_2O_3$ Deposited by Electron Beam Evaporation," *Carbon*, 2006, 44(2), 348-359.

Hart, A.J., et al., "Force Output, Control of Film Structure, and Microscale Shape Transfer by Carbon Nanotube Growth under Mechanical Pressure," *Nano Letters*, 2006, 6(6), 1254-1260.

Hart, A.J., "Chemical, Mechanical, and Thermal Control of Substrate-Bound Carbon Nanotube Growth," *Doctoral Thesis*, Department of Mechanical Engineering, MIT, Dec. 31, 2006.

Hinds, B.J., et al., "Aligned Multiwalled Carbon Nanotube Membranes," *Science*, 2004, 303, 62-65.

Huang, X., et al., "Inherent-opening-controlled pattern formation in carbon nanotube arrays," *Nanotech.*, 2007, 18, 305301 (6 pages).

Iijima, S., "Helical microtubules of graphitic carbon," *Nature*, 1991, 354, 56-58.

Kwok, K., et al., "Continuous Deposition of Carbon Nanotubes on a Moving Substrate by Open-Air Laser-Induced Chemical Vapor Deposition," *Carbon*, 2005, 43(12), 2571-2578.

Kis, A., et al., "Reinforcement of Single-Walled Carbon Nanotube Bundles by Intertube Bridging," *Nature Materials*, 2004, 3(3), 153-157.

Koratkar, N.A., et al., "Multifunctional Structural Reinforcement Featuring Carbon Nanotube Films," *Composites Science and Technology*, 2003, 63, 1525-1531.

Krasheninnikov, A.V. et al., "Ion-Irradiation-Induced Welding of Carbon Nanotubes," *Physical Review B.*, 2002, 66(24) 2455403-1-6.

Krasheninnikov, A.V. et al., "Irradiation Effects in Carbon Nanotubes," *Nuclear Instruments and Methods in Physics Research B*, 2004, 216, 355-366.

Laborde-Lahoz et al., "Mechanical Characterization of Carbon Nanotube Composite Materials," *Mech. Adv. Mater. Struct.*, 2005, 12, 13-19.

Li, Y.L., et al., "Direct Spinning of Carbon Nanotube Fibers from Chemical Vapor Deposition Synthesis," *Science*, 2004, 304, 276-278.

Liu, L.-Q., et al., "Tensile Mechanics of Electrospun Multiwalled Nanotube/Poly(methyl methacrylate) Nanofibers," *Adv. Mater.*, 2007, 19, 1228-1233.

Liu, H., et al., "Wetting and Anti-Wetting on Aligned Carbon Nanotube Films," *Soft Matter*, 2006, 2, 811.

Miaudet, P., et al., "Hot-Drawing of Single and Multiwall Carbon Nanotube Fibers for High Toughness and Alignment," *Nano Lett.*, 2005, 5(11), 2212-2215.

Oberlin et al., "Filamentous Growth of Carbon Through Benzene Decomposition," *J. Cryst. Growth*, 1976, 32, 335-349.

Podsiadlo, P., "Ultrastrong and Stiff Layered Polymer Nanocomposites," *Science*, 2007, 318, 80-83.

Raravikar, N.R., et al., "Synthesis and Characterization of Thickness-Aligned Carbon Nanotube-Polymer Composite Films," *Adv. Mater.*, 2005, 17, 974-983.

Ryan, K.P., et al., "Multiwalled carbon nanotube nucleated crystallization and reinforcement in poly (vinyl alcohol) composites," *Synth. Met.*, 2006, 156, 332-335.

Salalha, W., et al., "Single-Walled Carbon Nanotubes Embedded in Oriented Polymeric Nanofibers by Electrospinning," *Langmuir*, 2004, 20, 9852-9855.

Sandler, J.K.W., et al., "Ultra-Low Electrical Percolation Threshold in Carbon-Nanotube-Epoxy Composites," *Polymer*, 2003, 44(19), 5893-5899.

Schadler, L.S., et al., "Designed Interfaces in Polymer Nanocomposites: A Fundamental Viewpoint," *MRS BULL*, 2007, 32, 335-340.

Schulte, K. et al. Editorial, *Compos. Sci. Technol.*, 2007, 67, 777.

Shim, B.S., et al., "Integration of Conductivity, Transparency, and Mechanical Strength into Highly Homogeneous Layer-by-Layer Composites of Single-Walled Carbon Nanotubes for Optoelectronics," *Chemical Materials*, 2007, 19(23), 5467-5474.

Terrones, M., et al., "Controlled Production of Aligned-Nanotube Bundles," *Nature*, 1997, 388(6637), 52-55.

Thostenson, E.T., et al., "Advances in the Science and Technology of Carbon Nanotubes and Their Composites: A Review," *Composites Science and Technology*, 2001, 61(13), 1899-1912.

Thostenson, E.T., et al., "Nanocomposites in Context," *Composites Science and Technology*, 2005, 65(3-4), 491-516.

Thostenson, E.T., et al., "Carbon Nanotube/Carbon Fiber Hybrid Multiscale Composites," *Journal of Applied Physics*, 2002, 91(9), 6034-6037.

Tong,T., et al., "Dense Vertically Aligned Multiwalled Carbon Nanotube Arrays as Thermal Interface Materials," *IEEE Trans. Components and Packaging*, 2007, 30(1), 92-100.

Vaia, R.A., et al., "Framework for nanocomposites," *Mater Today*, 2004, 32-37.

Veedu, V.P., et al., "Multifunctional Composites Using Reinforced Laminae With Carbon-Nanotube Forests," *Nature Materials*, 2006, 2006, 5, 457-462.

Vigolo, B., et al., "Macroscopic Fibers and Ribbons of Oriented Carbon Nanotubes," *Science*, 2000, 290, 1331-1334.

Wagner, H.D., et al., "Nanotube-Polymer Adhesion: A Mechanics Approach," *Chemical Physics Letters*, 2002, 361(1-2), 57-61.

Wang, B.N., et al., "Quantative Characterization of the Morphology of Multiwall Carbon Nanotube Films by Small-Angle X-ray Scattering," *J. Phys. Chem. C*, 2007, 111, 5859-5865.

(56) References Cited

OTHER PUBLICATIONS

Wang, C.Y., et al., "Strong Carbon-Nanotube-Polymer Bonding by Microwave Irradiation," *Adv. Funct. Mater.*, 2007,17(12), 1979-1983.
Wardle, B.L., et al., "Fabrication and Characterization of Ultrahigh-Volume-Fraction Aligned Carbon Nanotube-Polymer Composites," *Adv. Mater.*, 2008, 20, 2707-2714.
Windle, A.H., et al. "Two defining moments: A personal view by Prof. Alan H. Windle," *Compos. Sci. Technol.*, 2007, 67, 929-930.
Winey, K.I., et al. "Polymer Nanocomposites," *MRS Bulletin*, 2007, 32, 314-322.
Yamamoto, N. et al., "Fabrication and Multifunctional Characterization of Hybrid Woven Composites Reinforced by Aligned Carbon Nanotubes," *Proc. of the 16th Int. Conf. on Composite Material (ICCM)*, Kyoto Japan, Jul. 8-13, 2007.
Zhao, B., et al, "A Bone Mimic Based on the Self-Assembly of Hydroxyapatite on Chemically Functionalized Single-Walled Carbon Nanotubes," *Chem. Mater.*, 2005, 17(120), 3225-3241.
Zhang, M., et al., "Multifunctional Carbon Nanotube Yarns by Downsizing an Ancient Technology," *Science*, 2004, 306, 1358-1361.
Bedewy, et al., "Population Growth Dynamics of Carbon Nanotubes," *ACS Nano*, vol. 5, No. 11, pp. 8974-8989 (2011).
Futaba, et al., "84% Catalyst Activity of Water-Assisted Growth of Single Walled Carbon Nanotube Forest Characterization by a Statistical and Macroscopic Approach," *J. Phys. Chem. B*, vol. 110, pp. 8035-8038 (2006).

\* cited by examiner

Biaxial Mechanical Densification of CNT forest

Submersion method for polymer wetting

Curing and Polishing/Machining of A-CNT NC Sample

CONTROLLED-ORIENTATION FILMS AND NANOCOMPOSITES INCLUDING NANOTUBES OR OTHER NANOSTRUCTURES

RELATED APPLICATIONS

This application claims the benefit of and is a continuation-in-part of U.S. patent application Ser. No. 11/586,310, filed Oct. 25, 2006, published as U.S. Patent Application No. 2008/0187648 on Aug. 7, 2008, entitled "Apparatus and Methods for Controlled Growth and Assembly of Nanostructures," by Hart, et al., which in turn claims the benefit of U.S. Provisional Patent Application Ser. No. 60/729,881, filed Oct. 25, 2005, entitled "Apparatus and Methods for Controlled Growth and Assembly of Nanostructures," by Hart, et. al. both of which are incorporated herein by reference in their entirety for all purposes. This application also claims the benefit of U.S. Provisional Patent Application Ser. No. 61/114,967, filed Nov. 14, 2008, entitled "Controlled-Orientation Films and Nanocomposites including Nanotubes or Other Nanostructures," by Garcia, e. al., which is incorporated herein by reference in its entirety for all purposes.

FIELD OF THE INVENTION

The present invention generally relates to the processing of nanostructures, composite materials comprising nanostructures, and related systems and methods.

BACKGROUND

Composites are heterogeneous structures comprising two or more components, the combination taking advantage of the individual properties of each component as well as synergistic effects if relevant. Advanced composites refer to a class of materials in which engineered (e.g., man-made) fibers are embedded in a matrix, typically with the fibers being aligned or even woven such that a material with directional (anisotropic) properties is formed. Composite materials have been used in the Stealth Bomber and Fighter and in sporting equipment, among other applications. Advanced composite systems comprising multiple materials can also be useful in applications where performance benefits from weight savings.

Nanostructures such as carbon nanotubes are envisioned as constituents in these applications due to their attractive multifunctional (mechanical and non-mechanical) properties. For example, at small scales, carbon nanotubes exhibit high specific stiffness, density-normalized modulus (E/rho), and electrical conductivity. Similar to existing advanced-fiber composites, the ideal morphology nanocomposite has a high volume fraction of aligned, collinear, continuous, high-quality nanostructures homogeneously dispersed in a surrounding matrix without voids or inclusions. The properties of composites with a high volume fraction of nanostructures are dominated by the properties of the nanostructures, while the matrix material provides support. However, existing nanostructure processing techniques often display several drawbacks. For example, the syntheses of nanostructures (for example, carbon nanotubes) often result in low volume fractions, large diameters, insufficient lengths, and poor alignment of the nanostructure axes. Also, dispersion of the nanostructures in secondary materials, which typically requires uniform wetting of the nanostructures by the secondary materials, is often hindered by nanostructure agglomeration. Last, alignment of nanostructures in the secondary materials may be difficult to achieve in general. There are numerous examples of composites comprised of disordered arrangements and/or low volume fractions of nanostructures which exhibit one or more of these drawbacks.

Accordingly, improved materials and methods would be beneficial.

SUMMARY OF THE INVENTION

The present invention relates generally to the processing of nanostructures, composite materials comprising nanostructures, and related systems and methods. The subject matter of the present invention involves, in some cases, interrelated products, alternative solutions to a particular problem, and/or a plurality of different uses of one or more systems and/or articles.

In some embodiments, a method is provided. One set of embodiments comprises a method of producing a material, comprising providing a plurality of nanostructures at least some of which have long axes, wherein the long axes of the nanostructures are substantially aligned relative to each other, each nanostructure is positioned relative to an adjacent nanostructure at a distance so as to together define an average distance between adjacent nanostructures, and the plurality of nanostructures extends a distance at least 10 times greater than the average distance between adjacent nanostructures in each of two orthogonal directions each perpendicular to the long axes. The method can also comprise applying, to the plurality of nanostructures, a first force with a first component normal to the long axes of the nanostructures, wherein the application of the first compressive force reduces the average distance between the nanostructures. In some instances, the method further comprises applying a second compressive force with a second component, wherein the second component is normal to the average direction of the long axes of the nanostructures and orthogonal to the first component, and wherein the application of the second compressive force reduces the average distance between the nanostructures.

In one set of embodiments, a method of producing a material can comprise growing a plurality of nanostructures on a surface of a substrate, wherein the long axes of the nanostructures are substantially aligned and non-parallel to the substrate surface, to form an assembly of nanostructures having a thickness defined by the long axes of the nanostructures and applying a first force with a first component normal to the long axes of the nanostructures, wherein the application of the first force reduces the average distance between the nanostructures. In some cases, the thickness of the assembly and the magnitude of the force can be together selected to compress the nanostructures to form a device having a predetermined level of absorption of electromagnetic radiation.

In another set of embodiments, a method of producing a material can comprise providing an article comprising a plurality of nanostructures, wherein the volume fraction of the nanostructures within the article is at least about 5%; applying a precursor support material to the plurality of nanostructures such that the precursor support material is transported between the nanostructures; and solidifying the support material to form a nanocomposite material.

In one set of embodiments, a method of producing a material can comprise providing a plurality of nanostructures, wherein the long axes of the nanostructures are substantially aligned relative to each other; applying a precursor support material to the plurality of nanostructures such that the precursor support material is transported between the nanostructures via capillary forces; and solidifying the support material to form a nanocomposite material.

In yet another set of embodiments, a method can comprise providing a substrate on which a plurality of nanostructures is attached, and exposing the nanostructures to hydrogen such that the nanostructures are delaminated from the substrate.

In some embodiments, an article is provided. In one set of embodiments, an article comprises a plurality of nanostructures wherein the long axes of the nanostructures are substantially aligned relative to each other, each nanostructure is positioned relative to an adjacent nanostructure at a distance so as to together define an average distance between adjacent nanostructures, and the plurality of nanostructures extends a distance at least 10 times greater than the average distance between adjacent nanostructures in each of two orthogonal directions each perpendicular to the long axes. In addition, in some embodiments, the volume fraction of the nanostructures within the material can be at least about 5%.

In one set of embodiments, an article comprises a plurality of nanostructures wherein the long axes of the nanostructures are substantially aligned relative to each other, each nanostructure is positioned relative to an adjacent nanostructure at a distance so as to together define an average distance between adjacent nanostructures, and the plurality of nanostructures extends a distance at least 10 times greater than the average distance between adjacent nanostructures in each of two orthogonal directions each perpendicular to the long axes. In addition, in some embodiments, the average distance between the nanostructures can be less than about 80 nm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
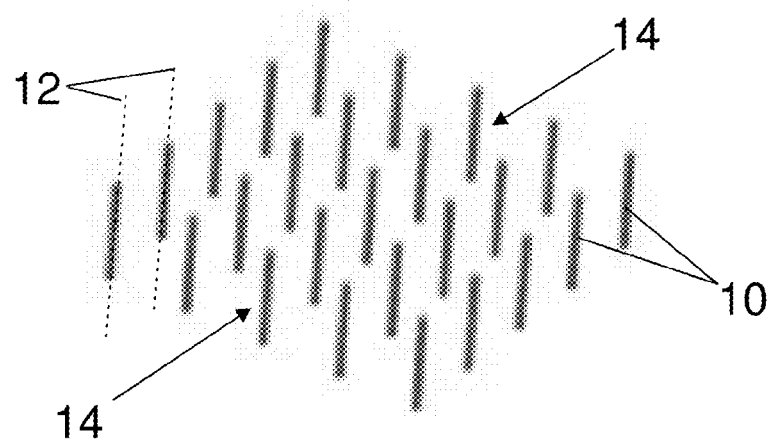
FIGS. 1A-1C include schematic diagrams illustrating the densification of nanostructures, according to one set of embodiments.

Generally, the present invention provides methods for the production of materials comprising a plurality of nanostructures such as nanotubes (e.g., carbon nanotubes) and related articles. The plurality of nanostructures may be provided such that their long axes are substantially aligned and, in some cases, continuous from end to end of the sample. For example, in some cases, the nanostructures may be fabricated by uniformly growing the nanostructures on the surface of a substrate, such that the long axes are aligned and non-parallel to the substrate surface. The nanostructures may be, in some instances, substantially perpendicular to the substrate surface. In one set of embodiments, a force with a component normal to the long axes of the nanostructures may be applied to the substantially aligned nanostructures. The application of a force may result in a material comprising a relatively high volume fraction or mass density of nanostructures. In some instances, the application of a force may result in a material comprising relatively closely-spaced nanostructures. The materials described herein may be further processed for use in various applications, such as composite materials. For example, a set of aligned nanostructures may be formed, and, after the application of a force, transferred, either in bulk or to another surface, and combined with another material to enhance the properties of the material.

In some embodiments, materials comprising nanostructures are also provided. In some cases, the materials may comprise a relatively high volume fraction or mass density of nanostructures. In some instances, the materials may comprise relatively closely-spaced nanostructures. Materials comprising nanostructures may also have desirable optical properties such as the ability to absorb a high fraction of incident electromagnetic radiation. In some cases, the nanostructures may enhance the mechanical properties of a material, for example, providing mechanical reinforcement at an interface between two materials or plies. The nanostructures may also enhance thermal and/or electronic properties of a material. In some cases, the aligned nanostructures may provide the ability to tailor one or more anisotropic properties of a material, including mechanical, thermal, electrical, and/or other properties.

As used herein, the term "nanostructure" refers to elongated chemical structures having a diameter on the order of nanometers and a length on the order of microns to millimeters or more, resulting in an aspect ratio greater than 10, 100, 1000, 10,000, or greater. The term "long axis" is used to refer to the imaginary line drawn parallel to the longest length of the nanostructure and intersecting the geometric center of the nanostructure. In some cases, the nanostructures may have an average maximum cross-sectional dimension of less than about 1 µm, less than about 500 nm, less than about 250 nm, less than about 100 nm, less than about 75 nm, less than about 50 nm, less than about 25 nm, less than about 10 nm, or, in some cases, less than about 1 nm. As used herein, the "maximum cross-sectional dimension" refers to the largest distance between two opposed boundaries of an individual structure that may be measured. In some instances, the nanostructure has a cylindrical or pseudo-cylindrical shape. The nanostructure may be, for example, a nanotube (e.g., a carbon nanotube), a nanowire, or a nanofiber, among others. In some embodiments, the nanostructures used in the systems and methods described herein may be grown on a growth substrate. In other embodiments, the nanostructures may be provided separately from their growth substrate, either attached to another substrate, or as a self-supporting structure detached from any substrate.

In some embodiments, the articles and methods described herein comprise carbon-based nanostructures. As used herein, a "carbon-based nanostructure" is a nanostructure that comprises at least about 30% carbon by mass. In some embodiments, the carbon-based nanostructures may comprise at least about 40%, at least about 50%, at least about 60%, at least about 70%, at least about 80%, at least about 90%, or at least about 95% of carbon by mass, or more. Example of carbon-based nanostructures include carbon nanotubes, carbon nanowires, carbon nanofibers, and the like.

In some cases, a plurality of nanostructures may be interconnected, for instance, via bonds or mechanical entanglement. For example, the nanostructures may be interconnected via covalent bonds (e.g. carbon-carbon, carbon-oxygen, etc.), ionic bonds, hydrogen bonds, dative bonds, or the like. A plurality of nanostructures may also be interconnected via Van der Waals interactions in some cases. In some cases, a plurality of nanostructures may form a self-supporting structure. As used herein, a "self-supporting structure" refers to a structure (e.g., solid, non-solid) having sufficient stability or rigidity to maintain its structural integrity (e.g., shape) without external support along surfaces of the structure. The terms "assembly" and "assembly of nanostructures" are used to refer to a plurality of self-supporting nanostructures. It should be understood that an assembly of nanostructures may form a self-supporting structure that may be manipulated, for example, as a film without the need for an additional support material, substrate, or any other material.

In one set of embodiments, methods for producing a nanostructure-based materials are provided. For example, FIG. 1 includes a schematic illustration of a method of reducing the average distance between adjacent nanostructures, according to one set of embodiments. A plurality of nanostructures 10 can be provided such that the long axes of the nanostructures, indicated by dashed lines 12, can be substantially aligned relative to each other. Each nanostructure can positioned relative to an adjacent nanostructure at a distance so as to together define an average distance between adjacent nanostructures. In the set of embodiments illustrated in FIG. 1A, the average distance between adjacent nanostructures is roughly equal for each nanostructure. In other embodiments, the distances between adjacent nanostructures may vary. In addition, in some embodiments, the originally provided plurality of nanostructures extends a distance at least 10 times greater than the average distance between adjacent nanostructures in each of two orthogonal directions, each direction perpendicular to the long axes. In some cases, the plurality of nanostructures extends, in two orthogonal directions each perpendicular to the long axes, a distance at least 100 times greater, at least 1000 times greater, at least 10,000 times greater or longer than the average distance between adjacent nanostructures.

Figure 1B:
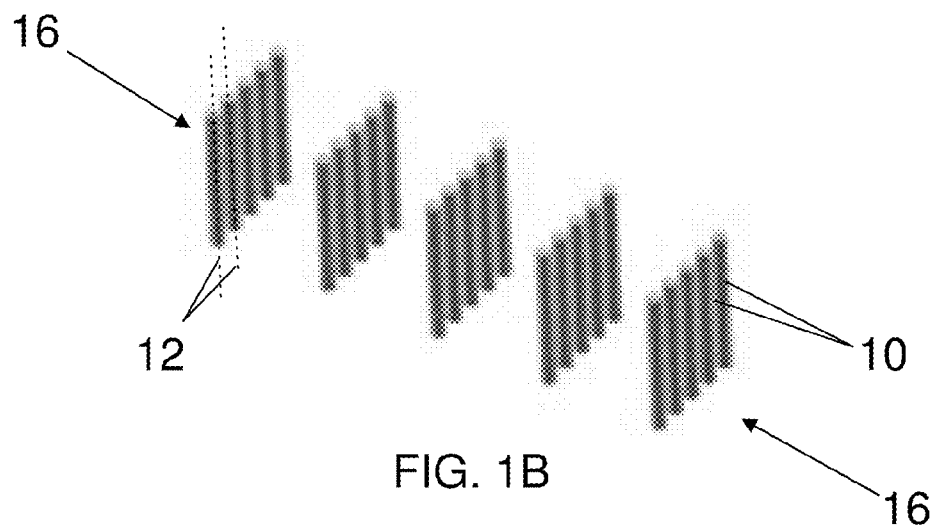

A first force with a component normal to the long axes of the nanostructures may be applied to the plurality of nanostructures. In the set of embodiments illustrated in FIG. 1A, the first force is applied as a compressive force in the direction of arrows 14. The application of the first force may result in the reduction of the average distance between the nanostructures. For example, FIG. 1B shows the resulting reduction of the average distance after the application of a first force in the direction of arrows 14.

The force described herein may be applied using any method known in the art. In some embodiments, a mechanical tool is used to apply the force to the plurality of nanostructures. For example, an operator may apply a flat surface of a tool (e.g., a plastic plunger) against the side of a plurality of nanostructures, and compress the nanostructures by hand. In some embodiments, the force may be applied using compression springs. For example, the plurality of nanostructures may be situated in an enclosed or semi-enclosed containment structure with one or more compression springs situated between the side of the plurality of nanostructures and an adjacent wall of the containment structure. Forces may be applied using other elements including, but not limited to, weights, machine screws, and/or pneumatic devices, among others. For example, in one set of embodiments, a plurality of nanostructures is arranged between two plates. A device (e.g., a machine screw, a spring, etc.) may be used to apply pressure against the sides of the nanostructures via the plates. In the case of a machine screw, for example, the nanostructures may be compressed between the plates upon rotating the screw. In still other embodiments, a liquid may be applied to the plurality of nanostructures and dried; upon drying, capillary forces may pull the nanostructures together, resulting in a reduction of the average distance between nanostructures. Other methods of applying forces to the plurality of nanostructures can be envisioned by one of ordinary skill in the art.

Figure 1C:
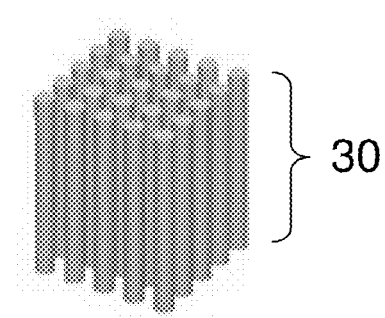

In some embodiments, a second force may be applied to the nanostructures. The second force may include a second component that is normal to the long axes of the nanostructures and orthogonal to the first component of the first force. As an example, in FIG. 1B, the second force may comprise a compressive force applied in the direction of arrows 16. The application of the second force may lead to a further reduction of the average distance between adjacent nanostructures. For example, FIG. 1C shows the resulting reduction of the average distance between adjacent nanostructures after the application of a second force in the direction of arrows 16. In some embodiments, the second force can be applied at the same time as the first force. The second force can be applied, in some instances, after the first force is applied.

The application of a first and/or second force may reduce the average distance between adjacent nanostructures by varying amounts. In some cases, the average distance between adjacent nanostructures is reduced by at least about 25%. In some instances, the average distance between adjacent nanostructures is reduced by at least about 50%, at least about 70%, at least about 80%, at least about 90%, at least about 95%, at least about 99%, or more. In some embodiments, the average distance between adjacent nanostructures may be reduced to less than about 80 nm, less than about 60 nm, less than about 40 nm, less than about 30 nm, less than about 20 nm, less than about 10 nm, less than about 5 nm, or shorter.

In some embodiments, the methods described herein may be used to produce materials with high volume fractions of nanostructures. As used herein, the volume fraction of nanostructures within a material (e.g., a plurality of nanostructures, a nanocomposite, etc.) is calculated by dividing the sum of the volumes defined by the nanostructures by the total volume defined by the material. It should be noted that the volume defined by a nanostructure may contain some void space. For example, in the case of a hollow nanotube, the volume defined by the nanotube would include the interior void space within the tube. Forces may be applied to a plurality of nanostructures until the volume fraction of the nanostructures within the material is at least about 5%. In some instances, the forces are applied until the volume fraction of the nanostructures within the material is at least about 10%, at least about 20%, at least about 40%, at least about 60%, at least about 70%, at least about 75%, at least about 78%, or more.

In some embodiments, the plurality of nanostructures may be provided as a self-supporting material. In other cases, the nanostructures may be attached to a substrate (e.g., a growth substrate). In some embodiments, the long axes of the nanostructures are substantially aligned and non-parallel to the substrate surface, having a thickness defined by the long axes of the nanostructures.

The plurality of nanostructures may comprise any desirable aspect ratio. In some cases, a plurality of nanostructures may provided such that the plurality extends, in at least one dimension (e.g., in one dimension, in two orthogonal dimensions, etc.) substantially perpendicular to the long axes, a distance at least about 1.5 times greater, at least about 2 times greater, at least about 5 times greater, at least about 10 times greater, at least about 25 times greater, at least about 100 times greater, or more than a dimension substantially parallel to the long axes of the nanostructures. As a specific example, the plurality of nanostructures may constitute a thin-film such that the long axes of the nanostructures are substantially perpendicular to the largest surface of the film. A plurality of nanostructures may be provided, in some instances, such that the plurality extends, in at least one dimension substantially parallel to the long axes, a distance at least about 1.5 times greater, at least about 2 times greater, at least about 5 times greater, at least about 10 times greater, at least about 25 times greater, at least about 100 times greater, or more than a dimension substantially perpendicular to the long axes of the nanostructures.

Figure 2A:
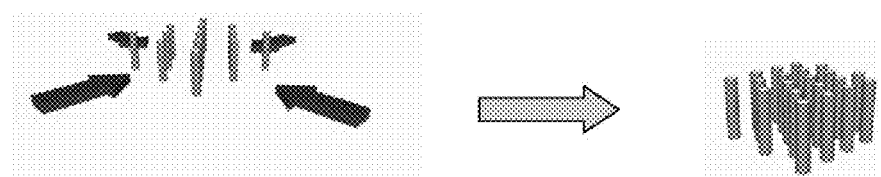
FIGS. 2A-2C include schematics and micrographs illustrating the fabrication of aligned nanostructure nanocomposites, according to one set of embodiments.
Figure 2A:
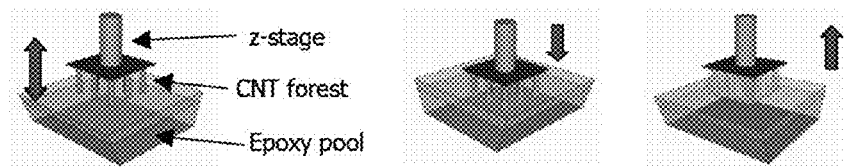
Figure 2A:
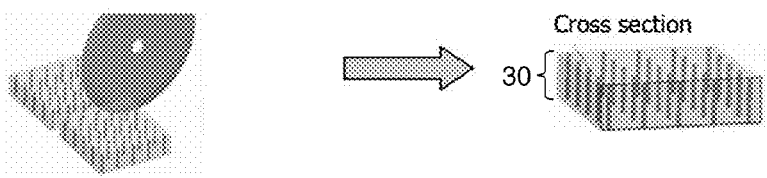

In some cases, at least 10%, at least about 20%, at least about 30%, at least about 40%, at least about 50%, at least about 60%, at least about 70%, or more of the nanostructures extend substantially through thickness of the plurality of nanostructures (e.g., wherein the thickness is defined as a dimension substantially parallel to the long axes of the nanostructures, such as dimension 30 in FIG. 1C and FIG. 2A).

In some cases, the nanostructures may be grown on a substrate. The nanostructures may be grown in the substrate using either a batch process or a continuous process. In one set of examples, the nanostructures may be synthesized by contacting a nanostructure precursor material with a catalyst material, for example, positioned on the surface of the growth substrate. In some embodiments, the nanostructure precursor material may be a nanotube precursor material and may comprise one or more fluids, such as a hydrocarbon gas, hydrogen, argon, nitrogen, combinations thereof, and the like. Those of ordinary skill in the art would be able to select the appropriate combination of nanotube precursor material, catalyst material, and set of conditions for the growth of a particular nanostructure. For example, carbon nanotubes may be synthesized by reaction of a $C_2H_4/H_2$ mixture with a catalyst material, such as nanoparticles of Fe arranged on an $Al_2O_3$ support. Examples of suitable nanostructure fabrication techniques are discussed in more detail in International Patent Application Serial No. PCT/US2007/011914, filed May 18, 2007, entitled "Continuous Process for the Production of Nanostructures Including Nanotubes," published as WO 2007/136755 on Nov. 29, 2007, which is incorporated herein by reference in its entirety.

In some embodiments in which the nanostructures are grown on a substrate, the set of substantially aligned nanostructures may be oriented such that the long axes of the nanostructures are substantially non-planar with respect to the surface of the growth substrate. In some cases, the long axes of the nanostructures are oriented in a substantially perpendicular direction with respect to the surface of the growth substrate, forming a nanostructure "forest." As described more fully below, an advantageous feature of some embodiments of the invention may be that the alignment of nanostructures in the nanostructure "forest" may be substantially maintained, even upon subsequent processing (e.g., application of a force to the forest, transfer of the forest to other surfaces, and/or combining the forests with secondary materials such as polymers, metals, ceramics, piezoelectric materials, piezomagnetic materials, carbon, and/or fluids, among other materials).

In some cases, the method may comprise the act of removing the nanostructures from the growth substrate. In some cases, the nanostructures may be covalently bonded to the substrate, and the removal step comprises breaking at least some of the covalent bonds. The act of removing may comprise transferring the nanostructures directly from the surface of the growth substrate to a surface of a receiving substrate. Removal of the nanostructures may comprise application of a mechanical tool, mechanical or ultrasonic vibration, a chemical reagent, heat, or other sources of external energy, to the nanostructures and/or the surface of the growth substrate. For example, a scraping ("doctor") or peeling blade, and/or other means such as an electric field may be used to initiate and continue delamination of the nanostructures from the substrate. In some cases, the nanostructures may be removed by application of compressed gas, for example. In some cases, the nanostructures may be removed (e.g., detached) and collected in bulk, without attaching the nanostructures to a receiving substrate, and the nanostructures may remain in their original or "as-grown" orientation and conformation (e.g., in an aligned "forest") following removal from the growth substrate.

In one set of embodiments, the attachment between the nanostructures and a substrate (e.g., covalent bonding) may be altered by exposing the nanostructures and/or substrate to a chemical (e.g., a gas). Exposing the nanostructures and/or substrate to the chemical may, in some cases, substantially reduce the level of attachment between the nanostructures and the substrate. Examples of chemicals that can be useful in reducing the level of attachment between the nanostructures and the substrate include, but are not limited to, hydrogen, oxygen, and air, among others. In some cases, elevated temperatures (e.g., temperatures greater than about 100° C.) may be used to expedite the detachment of nanostructures from the substrate. For example, nanostructures (e.g., carbon nanotubes) may be grown on a growth substrate and subsequently exposed to hydrogen gas while they remain in the processing chamber. Exposing the nanostructures to hydrogen may, in some cases, result in the delamination of the nanostructures from the growth substrate. In some embodiments, exposing the nanostructures to hydrogen may not result in the complete delamination of the plurality of nanostructures, but may, for example, result in the breaking of a large enough fraction of the bonds such that the force required to remove the plurality of nanostructures is reduced by at least about 50%, at least about 70%, at least about 90%, at least about 95%, at least about 99%, or more.

In some embodiments, the methods described herein may be used to control the dimensions of a plurality of nanostructures. In some embodiments, a plurality of nanostructures may be provided such that the long axes of the nanostructures are substantially aligned, and the plurality has a thickness defined by the long axes of the nanostructures (e.g., by the average length of the long axes of the nanostructures). The average length of the long axes of the plurality of nanostructures may be controlled, for example, by adjusting parameters (e.g., type of reactant used, time over which the nanostructures are grown, etc.) of the growth process. In some cases, the average length of the long axes of the plurality of nanostructures may be controlled by a post processing step such as polishing (e.g., chemical-mechanical polishing), chemical treatment, or some other step. As described herein, the average spacing between adjacent nanostructures may be controlled by the application of a force with a component normal to the long axes of the nanostructures.

The ability to control the dimensions of the plurality of nanostructures allows one to control the properties of the plurality. For example, in some embodiments, the thickness of the plurality of nanostructures and the magnitude of the force are together selected to compress the nanostructures to form a device having a predetermined level of absorption of electromagnetic radiation. In some embodiments, the thickness and force may be together selected to produce a plurality of nanostructures that can absorb at least about 50%, at least about 60%, at least about 70%, at least about 80%, at least about 90%, at least about 95%, at least about 99%, at least about 99.9%, at least about 99.99%, or at least about 99.999%, of incident electromagnetic radiation. As a specific example, the thickness and force may be together selected to produce a plurality of nanostructures that can absorb at least about 50%, at least about 60%, at least about 70%, at least about 80%, at least about 90%, at least about 95%, at least about 99%, at least about 99.9%, at least about 99.99%, at least about 99.999%, or more of incident visible light (e.g., light of wavelengths within the range of about 380 to about 750 nm, any 100-nm range of wavelengths within the range of about 380 to about 750 nm) and/or infrared radiation (e.g., light of wavelengths within the range of about 750 nm to about 1 mm, any 1000-nm range of wavelengths within the range of about 750 nm to about 1 mm). In some cases, the thickness of the plurality of nanostructures and the magnitude of the force are together selected to compress the nanostructures to form a device that absorbs a predetermined wavelength (and thus, frequency) of electromagnetic radiation. In some embodiments, the thickness of the plurality of nanostructures and the magnitude of the force are together selected to achieve a predetermined conductivity, resistance, modulus, or some other property.

In some embodiments, a plurality of nanostructures (e.g., a self-supporting structure comprising densified nanostructures) may exhibit a relatively large elastic modulus (e.g., in a direction substantially parallel to the average direction of the long axes of the aligned nanostructures). In some cases, the plurality of nanostructures may exhibit a higher elastic modulus along a direction substantially parallel to the average direction of the long axes of the aligned nanostructures, relative to the modulus as measured in an orthogonal direction. In one set of embodiments, a plurality of nanostructures (e.g., a self-supporting structure comprising densified nanostructures) may have an elastic modulus of at least about 1 GPa, at least about 10 GPa, at least about 100 GPa, at least about 1000 GPa, or higher along the nanostructure alignment axis (e.g., substantially parallel to the average direction of the long axes of the nanostructures). Suitable methods for determining the elastic modulus of a plurality of nanostructures are described in Example 2.

The present invention also provides methods for forming composite articles, wherein the composite articles comprise nanostructures (e.g., nanotubes) positioned within the composite article. Generally, the method can comprise providing a plurality of nanostructures, applying a precursor support material to the plurality of nanostructures such that the precursor support material is transported between the nanostructures, and solidifying the support material. In some instances, the plurality of nanostructures that are used to form the nanocomposite may be provided such that the long axes of the nanostructures are substantially aligned relative to each other. The plurality of nanostructures may also extend a distance at least 10 times greater than the average distance between adjacent nanostructures in each of two orthogonal directions, each perpendicular to the long axes of the nanostructures. In addition, in some embodiments, the plurality of nanostructures can remain substantially aligned after application of the precursor support material and/or after solidification of the support material. This can lead to the formation of solidified nanocomposite materials comprising substantially aligned nanostructures. This can also produce, in some cases, nanocomposites having non-isotropic physical properties (e.g., properties that are different when measured in a first direction substantially parallel to the average direction of the long axes of the aligned nanostructures, relative to the properties when measured in a second direction orthogonal to the first direction).

FIG. 2A includes an illustrative embodiment of a method for forming various composite materials of the invention. In the set of embodiments illustrated in FIG. 2A, a plurality of nanostructures are provided such that their long axes are substantially aligned. In some cases, the plurality of nanostructures may be attached to a substrate (e.g., a growth substrate). In other cases (as shown in FIG. 2A) the plurality of nanostructures may be provided as a self-supporting structure. The plurality of nanostructures may undergo densification, for example, uniaxial or biaxial densification via the application of one or more forces, as outlined above. The nanostructures in FIG. 2A undergo biaxial densification.

The precursor support material may be transported between the nanostructures via any method known to those of ordinary skill in the art. In some embodiments, the precursor support material may be transported between the nanostructures via capillary forces. In the set of embodiments illustrated in FIG. 2A, the plurality of nanocomposites is transported by a z-stage and submerged in a pool of epoxy precursor. The epoxy precursor can be transported between nanostructures via capillary action, and the nanostructures can be removed from the epoxy pool. In other embodiments, the precursor support material may be transported between the nanostructures by pressure driven flow, molding, or any other known technique.

The support material precursor may be hardened using any suitable method. In the set of embodiments illustrated in FIG. 2A, the epoxy may be cured, for example, by allowing the precursor material to set, or optionally by applying heat. In some embodiments, hardening may comprise the polymerization of the support material precursor.

The plurality of nanostructures that are used to form the nanocomposite may include desirable properties. For example, the plurality of nanostructures that are used to form the nanocomposite may comprise a high volume fraction of nanostructures within the plurality (e.g., at least about 5%, at least about 10%, at least about 20%, at least about 40%, at least about 60%, at least about 70%, at least about 75%, at least about 78%, or higher). The plurality of nanostructures that are used to form the nanocomposite may have an average distance between adjacent nanostructures of less than about 80 nm, less than about 60 nm, less than about 40 nm, less than about 30 nm, less than about 20 nm, less than about 10 nm, less than about 5 nm, or shorter.

In some cases, providing a plurality of nanostructures comprises catalytically forming nanostructures on the surface of a substrate. In other cases, the nanostructures may be provided as a self-supporting structure free of a growth substrate and/or any other material. In some cases, the precursor support material may be applied to a plurality of nanostructures that form a self-supporting structure, or the precursor support material may be applied to a plurality of nanostructures that are attached to a substrate. In addition, nanostructures may be solidified while attached to or apart from a growth substrate and/or any other support material.

The nanostructures within the composite may serve to enhance one or more properties of the composite article. As specific examples, the nanostructures may be arranged to enhance the intralaminar interactions of components within a material or substrate, to enhance the interlaminar interactions of two substrates or plies within a composite structure, or to mechanically strengthen or otherwise enhance the binding between the two substrates, among other functions. The support materials may provide mechanical, chemical, or otherwise stabilizing support for the plurality of nanostructures. In some cases, the support material may be a monomer, a polymer, a fiber, a ceramic, or a metal, and may be further processed to support the nanostructures. For example, a mixture of monomeric species may be added to the nanostructures, and subsequent polymerization of the monomeric species may produce a polymer matrix comprising the nanostructures disposed therein. As another example, a solgel can be applied to a plurality of nanostructures and processed to form a ceramic material between the nanostructures. In some embodiments, gas phase infiltration can be used to form carbonaceous material or silicon carbide between the nanostructures. Gas-phase infiltration may be executed by various processes such as chemical vapor deposition including decomposition of hydrocarbons. Examples of suitable support materials are described in detail below.

In some cases, the nanostructures are dispersed substantially uniformly within the hardened support material. For example, the nanostructures may be dispersed substantially uniformly within at least 10% of the hardened support material, or, in some cases, at least 20%, 30%, 40%, 50%, 60%, 70%, 80%, 90%, 95%, or 100% of the hardened support material. As used herein, "dispersed uniformly within at least X % of the hardened support material" refers to the substantially uniform arrangement of nanostructures within at least X % of the volume of the hardened support material. The ability to arrange nanostructures essentially uniformly throughout structures comprising plurality of fibers allows for the enhanced mechanical strength of the overall structure.

In another set of embodiments, nanostructure materials and nanocomposites are provided. The nanostructure materials and nanocomposites may be produced using any of the methods described herein. In some cases, the nanostructure materials or nanocomposites may comprise nanostructures with substantially-aligned long axes. The nanostructure materials or nanocomposites may also comprise a plurality of nanostructures that extends a distance at least 10 times greater than the average distance between adjacent nanostructures in each of two orthogonal directions, each direction perpendicular to the long axes.

In some embodiments, the nanostructures within the nanostructure material or composite may be closely spaced. For example, the average distance between adjacent nanostructures may be less than about 80 nm, less than about 60 nm, less than about 40 nm, less than about 30 nm, less than about 20 nm, less than about 10 nm, less than about 5 nm, or smaller. In some cases, the nanostructure materials or the nanocomposites may comprise a high volume fraction of nanostructures. For example, the volume fraction of the nanostructures within the materials may be at least about 10%, at least about 20%, at least about 40%, at least about 60%, at least about 70%, at least about 75%, at least about 78%, or higher.

The presence of nanostructures within composite materials may impart desirable properties. For example, in some cases a composite material may exhibit a higher mechanical strength and/or toughness when compared to an essentially identical material lacking the set of substantially-aligned nanostructures, under essentially identical conditions. In some cases, composite material may exhibit a higher thermal and/or electrical conductivity when compared to an essentially identical composite material lacking the set of substantially-aligned nanostructures, under essentially identical conditions. In some cases, the thermal, electrical conductivity, and/or other properties (e.g., electromagnetic properties, specific heat, etc.) may be anisotropic.

The nanostructure materials and nanocomposites described herein may exhibit desirable optical properties. In some embodiments, the nanostructure material or nanocomposite absorbs a high percentage of incident electromagnetic radiation. For example, the nanostructure material or nanocomposite may absorb at least about 90%, at least about 95%, at least about 99%, at least about 99.9%, at least about 99.99% at least about 99.999%, or more of incident electromagnetic radiation (e.g., visible light, infrared radiation, another specific band of wavelengths, etc.). In some cases, the nanostructure material or nanocomposite absorbs one or more predetermined wavelengths (and thus, frequencies) of electromagnetic radiation.

In some embodiments, a nanocomposite described herein may exhibit a relatively large elastic modulus. In some cases, a nanocomposite may exhibit a relatively large elastic modulus in a particular direction (e.g., substantially parallel to the average direction of the long axes of the aligned nanostructures within the nanocomposite). For example, in one set of embodiments, a nanocomposite (e.g., a nanocomposite comprising a polymer support material) may have an elastic modulus of at least about 5 GPa, at least about 7.5 GPa, at least about 10 GPa, or higher (e.g., in a direction substantially parallel to the average direction of the long axes of the aligned nanostructures). In some cases, an elastic modulus of a nanocomposite may be at least about 10%, at least about 25%, at least about 50%, at least about 100%, at least about 200%, at least about 500%, or at least about 1000% larger than the elastic modulus that would be exhibited by the support material absent the nanostructures, but under otherwise essentially identical conditions. In this context, essentially identical conditions means that the support material, temperature, dimensions, and other parameters of the structure and testing procedure would be substantially the same as the nanocomposite, but the nanostructures would not be present. Suitable methods for determining the elastic modulus of a nanocomposite are described in Example 2.

In some embodiments, a nanocomposite described herein may exhibit a relatively large electrical conductivity. In some cases, a nanocomposite may exhibit a relatively large electrical conductivity in a particular direction (e.g., substantially parallel to the average direction of the long axes of the aligned nanostructures within the nanocomposite) relative to an orthogonal direction. In some embodiments, a nanocomposite (e.g., a nanocomposite comprising a polymer support material) may have an electrical conductivity of at least about 0.1 S/m, 1 S/m, 10 S/m, or greater. In some cases, the electrical conductivity of a nanocomposite may be at least about 5 times, at least about 10 times, at least about 50 times, at least about 100 times, at least about 1000 times, at least about 10,000 times, at least about 100,000 times, at least about 1,000,000 times, at least about 10,000,000 times, or at least about 100,000,000 times larger than the electrical conductivity that would be exhibited by the support material absent the nanostructures, but under otherwise essentially identical conditions. In this context, essentially identical conditions means that the support material, temperature, dimensions, and other parameters of the structure and testing procedure would be substantially the same as the nanocomposite, but the nanostructures would not be present. Suitable methods for determining the electrical conductivity of a nanocomposite are described in Example 2.

As used herein, the term "nanotube" is given its ordinary meaning in the art and refers to a substantially cylindrical molecule or nanostructure comprising a fused network of primarily six-membered aromatic rings. In some cases, nanotubes may resemble a sheet of graphite formed into a seamless cylindrical structure. It should be understood that the nanotube may also comprise rings or lattice structures other than six-membered rings. Typically, at least one end of the nanotube may be capped, i.e., with a curved or nonplanar aromatic group. Nanotubes may have a diameter of the order of nanometers and a length on the order of millimeters, or, on the order of tenths of microns, resulting in an aspect ratio greater than 100, 1000, 10,000, or greater. In some cases, the nanotube is a carbon nanotube. The term "carbon nanotube" refers to nanotubes comprising primarily carbon atoms and includes single-walled nanotubes (SWNTs), double-walled CNTs (DWNTs), multi-walled nanotubes (MWNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the nanotube may have a diameter less than 1 µm, less than 100 nm, 50 nm, less than 25 nm, less than 10 nm, or, in some cases, less than 1 nm. In one set of embodiments the nanotubes have an average diameter of 50 nm or less, and are arranged in composite articles as described herein. The inorganic materials include semiconductor nanowires such as silicon (Si) nanowires, indium-gallium-arsenide (InGaAs) nanowires, and nanotubes comprising boron nitride (BN), silicon nitride ($Si_3N_4$), silicon carbide (SiC), dichalcogenides such as ($WS_2$), oxides such as titanium dioxide ($TiO_2$) and molybdenum trioxide ($MoO_3$), and boron-carbon-nitrogen compositions such as $BC_2N_2$ and $BC_4N$.

Substrates (e.g., growth substrates) suitable for use in the invention include prepregs, polymer resins, dry weaves and tows, inorganic materials such as carbon (e.g., graphite), metals, alloys, intermetallics, metal oxides, metal nitrides, ceramics, and the like. In some cases, the substrate may be a fiber, tow of fibers, a weave, and the like. The substrate may further comprise a conducting material, such as conductive fibers, weaves, or nanostructures.

In some embodiments, the substrates used herein are substantially transparent to electromagnetic radiation. For example, in some cases, the substrate may be substantially transparent to visible light, ultraviolet radiation, or infrared radiation.

In some cases, the substrates as described herein may be prepregs, that is, a polymer material (e.g., thermoset or thermoplastic polymer) containing embedded, aligned, and/or interlaced (e.g., woven or braided) fibers such as carbon fibers. As used herein, the term "prepreg" refers to one or more layers of thermoset or thermoplastic resin containing embedded fibers, for example fibers of carbon, glass, silicon carbide, and the like. In some embodiments, thermoset materials include epoxy, rubber strengthened epoxy, BMI, PMK-15, polyesters, vinylesters, and the like, and preferred thermoplastic materials include polyamides, polyimides, polyarylene sulfide, polyetherimide, polyesterimides polyarylenes polysulfones polyethersulfones polyphenylene sulfide, polyetherimide, polypropylene, polyolefins, polyketones, polyetherketones, polyetherketoneketone, polyeretherketones, polyester, and analogs and mixtures thereof. Typically, the prepreg includes fibers that are aligned and/or interlaced (woven or braided) and the prepregs are arranged such the fibers of many layers are not aligned with fibers of other layers, the arrangement being dictated by directional stiffness requirements of the article to be formed by the method. The fibers generally can not be stretched appreciably longitudinally, thus each layer can not be stretched appreciably in the direction along which its fibers are arranged. Exemplary prepregs include TORLON thermoplastic laminate, PEEK (polyether etherketone, Imperial Chemical Industries, PLC, England), PEKK (polyetherketone ketone, DuPont) thermoplastic, T800H/3900-2 thermoset from Toray (Japan), and AS4/3501-6 thermoset from Hercules (Magna, Utah).

Growth substrates described herein may be any material capable of supporting catalyst materials and/or nanostructures as described herein. The growth substrate may be selected to be inert to and/or stable under sets of conditions used in a particular process, such as nanostructure growth conditions, nanostructure removal conditions, and the like. In some cases, the growth substrate comprises a substantially flat surface. In some cases, the growth substrate comprises a substantially nonplanar surface. For example, the growth substrate may comprise a cylindrical surface.

As described herein, the invention may comprise use or addition of one or more binding materials or support materials. The binding or support materials may be polymer materials, fibers, metals, or other materials described herein. Polymer materials for use as binding materials and/or support materials, as described herein, may be any material compatible with nanostructures. For example, the polymer material may be selected to uniformly "wet" the nanostructures and/or to bind one or more substrates. In some cases, the polymer material may be selected to have a particular viscosity, such as 50,000 cPs or lower, 10,000 cPs or lower, 5,000 cPs or lower, 1,000 cPs or lower, 500 cPs or lower, 250 cPs or lower, or, 100 cPs or lower. In some embodiments, the polymer material may be selected to have a viscosity between 150-250 cPs. In some cases, the polymer material may be a thermoset or thermoplastic. In some cases, the polymer material may optionally comprise a conducting material, including conductive fibers, weaves, or nanostructures.

Examples of thermosets include Microchem SU-8 (UV curing epoxy, grades from 2000.1 to 2100, and viscosities ranging from 3 cPs to 10,000 cPs), Buehler Epothin (low viscosity, ~150 cPs, room temperature curing epoxy), West Systems 206+109 Hardener (low viscosity, ~200 cPs, room temperature curing epoxy), Loctite Hysol 1C (20-min curing conductive epoxy, viscosity 200,000-500,000 cPs), Hexcel RTM6 (resin transfer molding epoxy, viscosity during process ~10 cPs), Hexcel HexFlow VRM 34 (structural VARTM or vacuum assisted resin transfer molding epoxy, viscosity during process ~500 cPs). Examples of thermoplastic include polystyrene, or Microchem PMMA (UV curing thermoplastic, grades ranging from 10 cPs to ~1,000 cPs). In one embodiment, the polymer material may be PMMA, EpoThin, WestSystems EPON, RTM6, VRM34, 977-3, SUB, or Hysol1C.

The following applications and patents are incorporated herein by reference in their entirety for all purposes: U.S. Provisional Patent Application Ser. No. 60/729,881, filed Oct. 25, 2005, entitled "Apparatus and Methods for Controlled Growth and Assembly of Nanostructures," by Hart, et. al.; U.S. patent application Ser. No. 11/586,310, filed Oct. 25, 2006, published as U.S. Patent Application No. 2008/0187648 on Aug. 7, 2008, entitled "Apparatus and Methods for Controlled Growth and Assembly of Nanostructures," by Hart, et al.; U.S. Provisional Patent Application Ser. No. 61/114,967, filed Nov. 14, 2008, entitled "Controlled-Orientation Films and Nanocomposites including Nanotubes or Other Nanostructures," by Garcia, et al.; International Patent Application Serial No. PCT/US2007/011914, filed May 18, 2007, entitled "Continuous Process for the Production of Nanostructures Including Nanotubes," published as WO 2007/136755 on Nov. 29, 2007; International Patent Application Serial No. PCT/US07/11913, filed May 18, 2007, entitled "Nanostructure-reinforced Composite Articles and Methods," published as WO 2008/054541 on May 8, 2008; U.S. patent application Ser. No. 11/386,378, filed Mar. 22, 2006, entitled "Nano-Engineered Material Architectures: Ultra-Tough Hybrid Nanocomposite System;" and U.S. patent application Ser. No. 11/895,621, filed Aug. 24, 2007, entitled "Nanostructure-Reinforced Composite Articles," published as U.S. Patent Application Publication No. 2008/0075954 on Mar. 27, 2008.

EXAMPLES

The following examples are intended to illustrate certain embodiments of the present invention, but do not exemplify the full scope of the invention.

Example 1

In this example, a method is described to fabricate nanostructure assemblies and nanocomposites (NCs) using mechanical densification of vertically-aligned carbon nanotube (CNT) forests. The goal was to achieve a high volume fraction ($V_f$) of aligned, collinear, substantially continuous, high-quality CNTs homogeneously dispersed in a surrounding matrix without voids or inclusions: an aligned carbon nanotube nanocomposite (A-CNT NC). The mechanical densification process was used to densify as-grown aligned CNT forests (1% volume fraction CNTs) to achieve variable control of CNT volume fraction. Aligned assemblies and nanocomposites have been fabricated to high volume fractions, approaching posited theoretical limits.

The aligned nanotubes used in this example were grown by CVD method on a silicon substrate with catalyst deposited on it using e-beam. In this process, ethylene was used as the precursor and iron as the catalyst. CNT forests were grown on 1 cm×1 cm square silicon substrates. As-grown CNT forests were extracted easily from the substrate using a standard lab razor blade. After separation, nanotubes were held together by physical entanglement and Van der Waals forces in such a way that the forest could be handled as a film. A-CNT NCs were formed following the process described above (FIG. 2A) and characterized primarily using a JEOL 5910 and XL 30. These microscopes' resolutions were 1 µm and 50 nm, respectively.

In some instances, nanocomposites were formed by exposing the densified CNTs to unmodified complex thermosets, including aerospace-grade epoxies. Nanocomposites were formed via capillarity-induced wetting along the axes of the densified CNTs. Three polymers were used to fabricate the A-CNT NCs: 1-part, and 2-part, aerospace-grade epoxies used in resin-transfer molding (RTM) of carbon-fiber advanced composites, and SU-8, a UV-curable thermoset used extensively in microfabrication. High CNT volume fraction allows the properties of the CNTs to dominate the composite properties, while the matrix provides support (e.g., resisting buckling under shear or compression), protection, and a path for load-sharing between the CNTs. The mm-scale nanocomposites synthesized and characterized herein approached the ideal morphology desired for many applications, that of aligned CNTs dispersed uniformly in a polymer matrix.

The resulting NCs were characterized by optical, scanning, and transmission-electron microscopy, and small- and wide-angle x-ray scattering (SAXS and WAXS) to study alignment, dispersion, voids, and the effect of the closely-packed CNTs on polymer curing. X-ray studies were performed at the G1 beamline station at the Cornell High Energy Synchrotron Source (CHESS). The wavelength of the x-rays was 0.1239 nm, and the sample to detector distance was calibrated with silver behenate (first order scattering vector q of 1.076 nm$^{-1}$, with q=4π sin(theta/lambda), where 2*theta is the scattering angle and lambda is the wavelength). Slit collimation was used to achieve a resulting beam spot that is approximately 0.2 mm in height and 0.4 mm in width (the y- and x-axes, respectively). A slow-scan CCD-based x-ray detector, home built by Drs. M.

W. Tate and S. M. Gruner of the Cornell University Physics Department, was used for data collection.

SEM and x-ray scattering revealed that CNT alignment and distribution were maintained in the nanocomposites. No evidence was found of polymer morphology changes due to the closely-packed CNTs in wide-angle x-ray scattering studies. Variable control of volume fraction using the method demonstrated herein produced well-controlled mm-scale aligned-CNT nanocomposites that can be used to assess multifunctional properties of these aligned 'fiber' composites, and investigate nanoscale interactions between the constituents in a controlled manner.

Figure 2B:
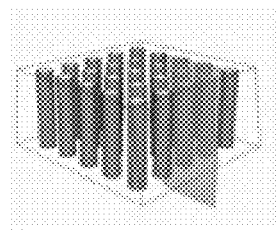
Figure 2B:
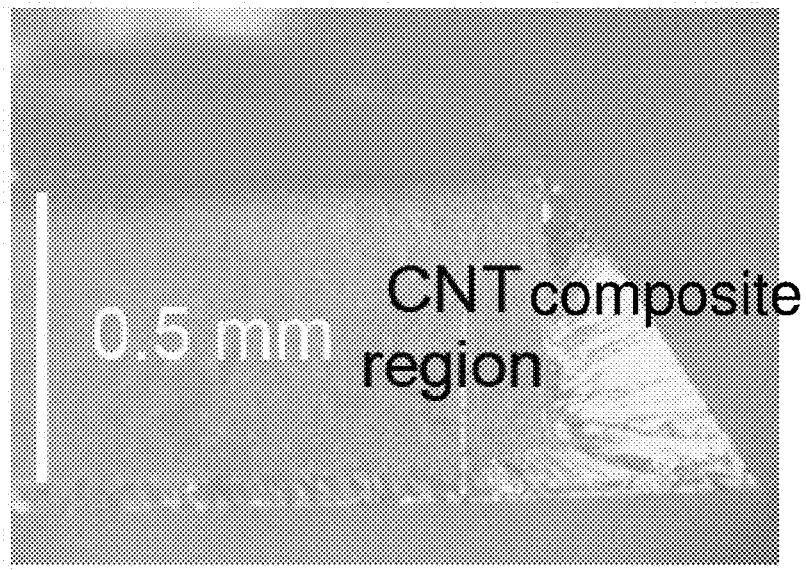
Figure 2C:
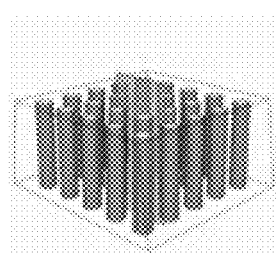
Figure 2C:
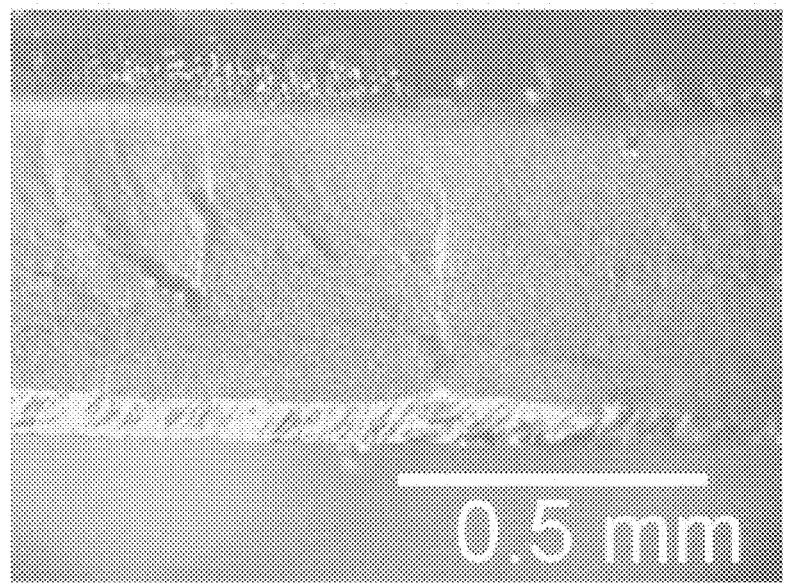
Figure 3:
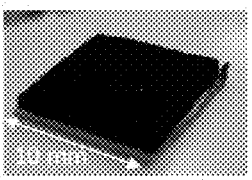
FIG. 3 includes photographs, schematics, and micrographs illustrating the densification of nanostructures, according to one set of embodiments.

FIG. 2A includes a schematic illustration of the process for fabricating variable volume fraction aligned-CNT nanocomposites. Using the process in FIG. 2A, mm-scale A-CNT NC specimens (FIG. 2B) with ultra-high (approaching practical and theoretical limits) CNT volume fraction were fabricated. The method allowed a continuum of volume fractions to be obtained by simply varying the degree of mechanical densification. Following the process in FIG. 2A, A-CNT forests were grown to mm-scale heights on a silicon substrate using a modified chemical vapor deposition (CVD) process. The resulting forests were characterized for alignment, CNT diameter distribution, and spacing. The CNTs had average diameters of 8 nm (2-3 walls), were spaced about 80 nm apart, and were continuous as a result of the base-growth process. The as-grown A-CNT volume fraction was 1%, giving a coverage of $10^9$-$10^{10}$ CNTs per cm$^2$. The CNTs were well-aligned as shown in FIG. 3. Alignment was further quantified using SAXS for variable volume fractions.

As mentioned, the forests were grown on 1-cm$^2$ silicon substrates, and the forests were released using a standard razor blade form the growth substrate. The released forest was placed in a small device that allowed mechanical biaxial compression in two orthogonal directions. By varying the distance the forest was compressed, variable density CNT forests were obtained as shown in FIG. 3. These densified forests were transferred to a z-stage using SEM tape and lowered into a pool of uncured polymer. The polymer pool was heated for the aerospace epoxies to simulate their processing, and SU8 was similarly heated to mimic pre-baking. The polymers infused into the CNT forest via capillary-induced wetting, at rates that depended on properties of the CNT forest (e.g., volume fraction) and the polymer (viscosity, contact angle, etc.). The epoxy was cured following the recommended process for each polymer, yielding the desired nanocomposites (FIG. 2B). Neither the CNTs nor the thermosets were modified, i.e., the CNTs were as-grown and the polymers were as-received (no solvents were utilized).

Characteristics of the thermosetting epoxies used in this work are given in Table 1. All epoxies were utilized following the manufacturer's recommended curing cycle. The advanced composite epoxies were used at elevated temperature, as they would be during resin transfer molding (RTM) processing of advanced composites. SU-8 was processed following standard microfabrication procedures used to create microstructures (exposure to UV light, which when combined with patterning allows polymer microstructures to be formed). Since regular light contains UV rays in its spectrum, this epoxy was used in a UV-free room. Experiments performed with SU-8 were performed at the Fabrication Lab from Microsystem Technology Laboratories (MTL/MIT).

TABLE 1

Thermoset Epoxy Characteristics

| Epoxy | Fabricant | Usual Application | Temperature during wetting | Viscosity at wetting temp. | Cure Cycle |
|---|---|---|---|---|---|
| VRM34 | Hexcel | Aerospace-grade Advanced Composites | 90° C. | 12 cP | 1 hour at 160° C. 3 hours at 180° C. |
| RTM6 | Hexcel | Aerospace-grade Advanced Composites | 90° C. | 33 cP | 1 hour at 160° C. 3 hours at 180° C. |
| SU-8 2002 | MicroChem | Microfabrication | 65° C. | 8 cP | Pre-bake: 60° C. for 5 min. Exposure: under UV light for 1 min. Post-Bake: 90° C. for 5 min. Hard bake: 130° C. for 30 min. |

Figure 4:
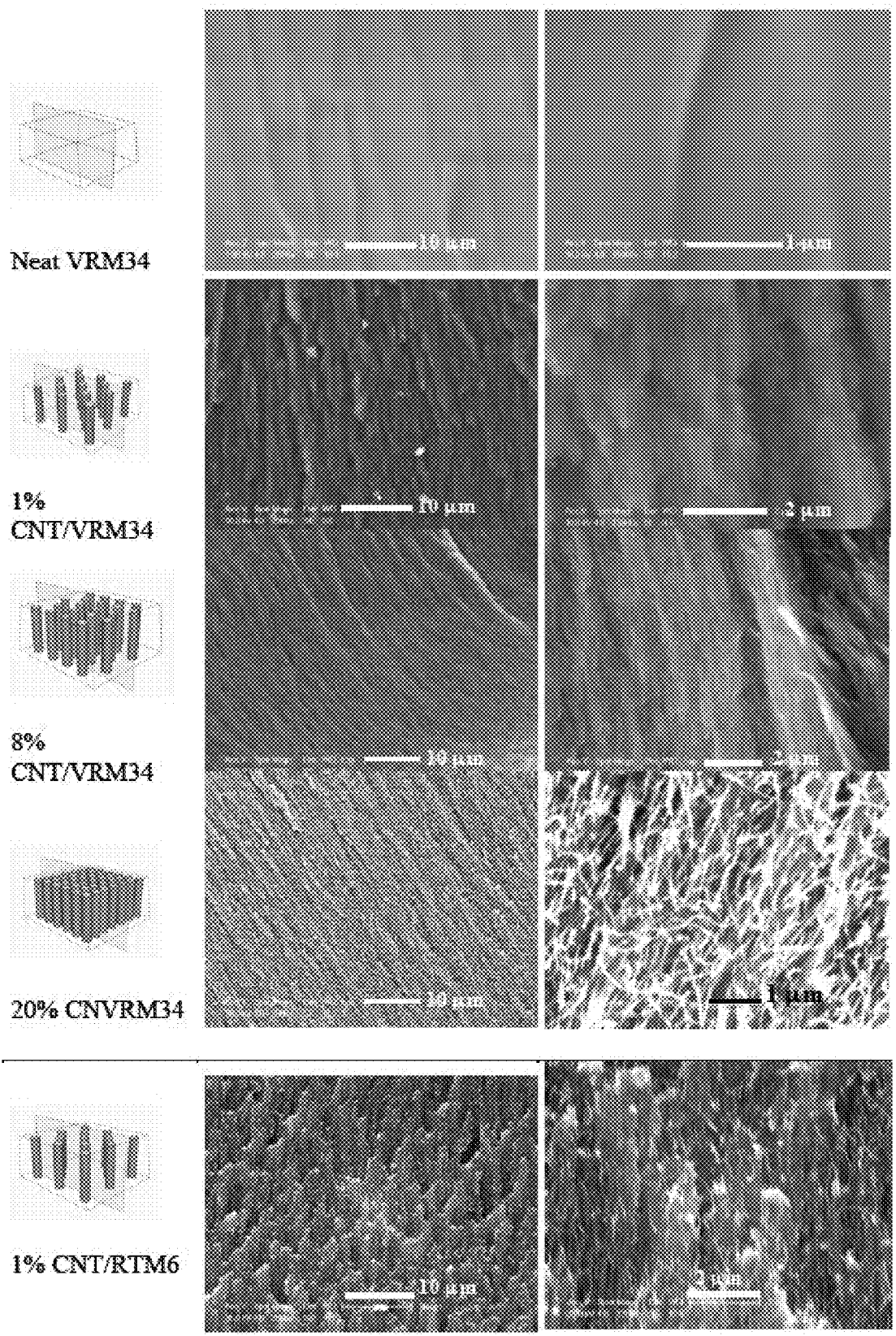
FIG. 4 includes schematics and micrographs illustrating one set of embodiments including aligned nanostructured composite materials.

After preparing the variable volume fraction A-CNT NCs, they were characterized using optical, scanning-electron, transmission-electron microscopy for dispersion, alignment and overall morphology (e.g., voids). Samples were mechanically fractured along the CNT axis (FIG. 4) to create surfaces to visualize the NC interior (see example optical fracture surfaces in FIG. 2). Fracture surfaces were utilized rather than polished surfaces because it was found to be more effective to visualize nanocomposites. A drawback of the fracture-surface preparation method was that the texture of the surface followed local crack propagations and was only indirectly linked to the actual morphology (this is a typical issue also in thin-film cross-sectional analyses). However, it was possible to discern morphology differences especially at high SEM magnification. Fracture surfaces for a series of increasing volume fraction NCs is presented in FIG. 4 for VRM34 resin. The neat resin provided a relatively smooth fracture surface, particularly at higher magnification, and there was a clear difference in the fracture surfaces of the NCs compared to the neat resin. Differences between low and high volume fraction NC fracture morphologies were also evident, especially at high magnification. At low magnification, the fracture surface was observed to become more homogeneous with increased CNTs, and at higher magnification, CNT density appeared to increase. There were also differences between resins, as can be observed in the 1% ACNT NCs for VRM34 and RTM6 epoxy in FIG. 4. Micron-scale voids were not observed in the NCs, except those that could be attributed to fabrication or handling issues, typically at the specimen edges. Micron-scale polymer regions were observed in some specimens, with a clear trend of reducing these regions at higher CNT volume fractions. Pure polymer regions effectively disappeared at CNT volume fractions greater than about 8%. Not wishing to be bound by any theory, these regions may have appeared due to the competition between the transverse stiffness of the CNT forest and the compaction forces generated during capillarity-induced wetting. At low CNT volume fraction, the CNT forests contracted to a greater degree when wetted by polymers than at higher volume fraction. At a certain volume fraction, dependent on CNT and polymer characteristics, the forest stiffness approximately balanced the compaction forces yielding close to no net volume change between the CNT forest and the NC. Conversely, at low volume fractions, the compaction forces split the forest and created regions that were filled by the infusing polymer.

The length of the CNTs (forest height) that was wetted by a given polymer was also investigated. This length has practical importance in hybrid advanced composite architectures, as capillarity-driven wetting is used to pull the polymers into forests of CNTs placed on or between advanced, micron-diameter fibers of traditional laminated composites. Viscosity primarily dictated the wetted length. For the epoxies studied in this example, with viscosities in the range of 8-33 cP, 1% volume fraction A-CNT forests were fully wet to heights exceeding 1 mm and no limit was observed.

Solvent-induced densification was also explored. In solvent-induced densification, low-viscosity and low boiling-point solvents (e.g., isopropanol) were introduced into the ends of a CNT forest. Due to capillary forces, the solvent was pulled into the forest, creating a densified, higher volume fraction A-CNT forest. The final spacing in the densified forest was a function of the solvent and forest. Solvent-induced densification was performed using isopropanol. When only solvent densification was used, the resulting forests were highly contracted, irregular, and contained micron-scale cells. Such structures were considered unsuitable for creating homogeneous A-CNT NCs. A hybrid technique was also attempted. Solvent- and mechanically-induced densification were combined. In this technique, moderately mechanically densified forests were produced and further densified, uniformly, using solvents. A-CNT forests were mechanically densified to ~10%, further densified with isopropanol to ~20%, and then, in some cases, wetted with resin to make a nanocomposite. The results were very similar (e.g., no voids or polymer-rich regions, aligned CNTs, etc.) to a 20% mechanical densification and polymer infusion process.

Figure 5:
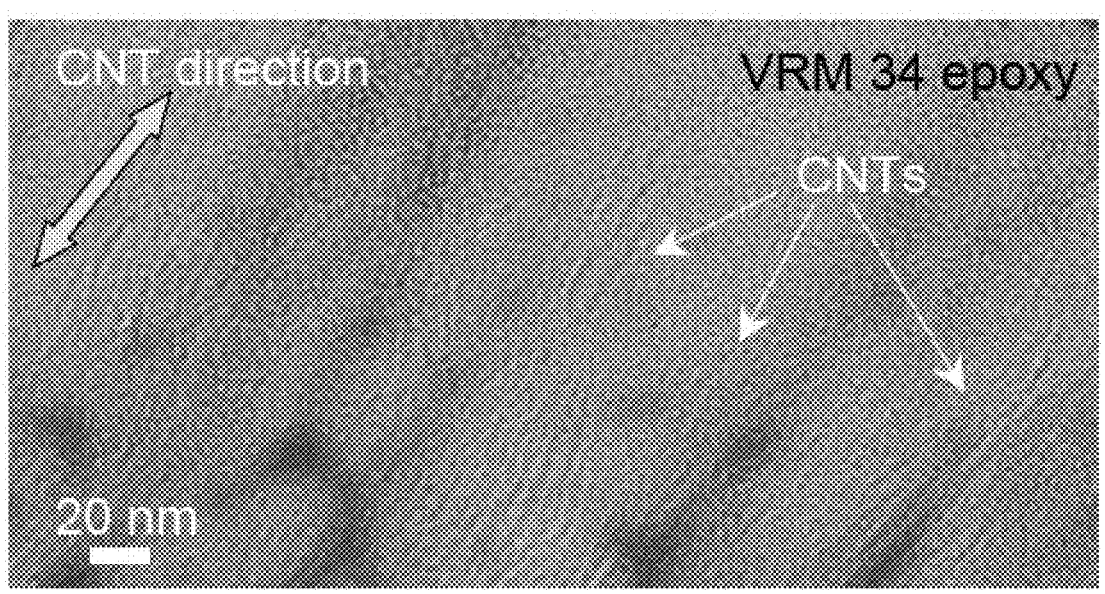
FIG. 5 includes a TEM of a cross-section of an aligned nanostructure composite, according to one set of embodiments.
Figure 6:
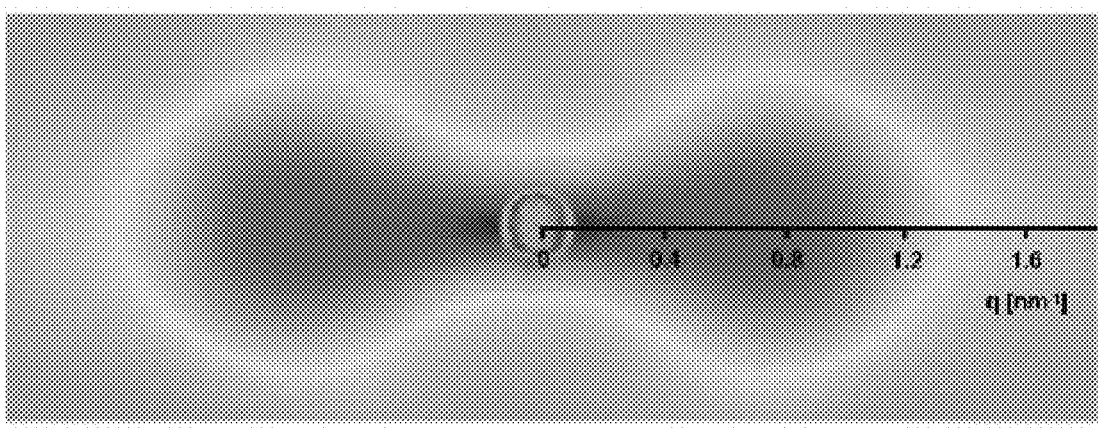
FIG. 6 includes a SAXS image of a nanostructure composite, according to one set of embodiments.

Nanocomposite cross-sections were also inspected under TEM. TEM samples were prepared using focused-ion beam (FIB) and imaged with a JOEL TEM2011. A TEM of an A-CNT NC with a CNT volume fraction of 8% is shown in FIG. 5. The CNT wall structure was clearly evident inside the epoxy matrix. Also, the CNT alignment was clearly visible. At this volume fraction, the average CNT spacing should be about 20 nm, which was confirmed by the TEM. It was not possible to discern whether polymer was inside the CNTs or not. Alignment of the CNTs within the NCs was also evaluated using small-angle x-ray scattering (SAXS). SAXS revealed that the aligned morphology of a CNT forest was maintained after the process steps (densification, wetting, and curing) to form an A-CNT NC. A typical SAXS image of an A-CNT NC sample is shown in FIG. 6, showing a characteristic asymmetric pattern of aligned structures. Alignment was quantified using the Hermans orientation parameter (f), which was calculated from an azimuthal scan of the scattered intensity at the location of the peak corresponding to the CNT form factor. Limiting values of f=1, 0, and −0.5 correspond to perfect vertical alignment, random orientation, and perfect horizontal alignment, respectively. The Hermans orientation parameter for the A-CNT NCs varied from 0.4-0.5, which was close to the value of 0.6-0.7 measured for as-grown CNT forests (1% volume fraction, undensified). Not wishing to be bound by any theory, the small decrease in the orientation parameter may have been due to, at least in part, the scattering contribution from the unoriented polymer.

Interfacial interactions can play a role in describing the mechanical and transport behavior of composites, and the role of the interface can be more pronounced for NCs because the interfacial area can be at least one order magnitude higher than traditional composites. Furthermore, the polymer can interact with the highly curved surface of the CNT, which can be on the order of the radius of gyration (~3-30 nm) for polymers. Polymers near the surface of a nanostructure can behave differently than those in the bulk, causing variations in the degree of cure, chain mobility, and chain conformation or crystallinity in the region near the nanostructure. The size of this modified region near the nanostructure, usually called the interphase region, can extend from between 10-100 nm from the surface. Thus, the existence of nanostructures during polymerization has been shown to induce polymer morphology changes, particularly crystallization, in several thermoplastics. Not wishing to be bound by any theory, the nanostructures may act as templates for the polymer to crystallize around. The effect on glass transition temperature can be measured, and the effect on mechanical properties can be significant.

Figure 7:
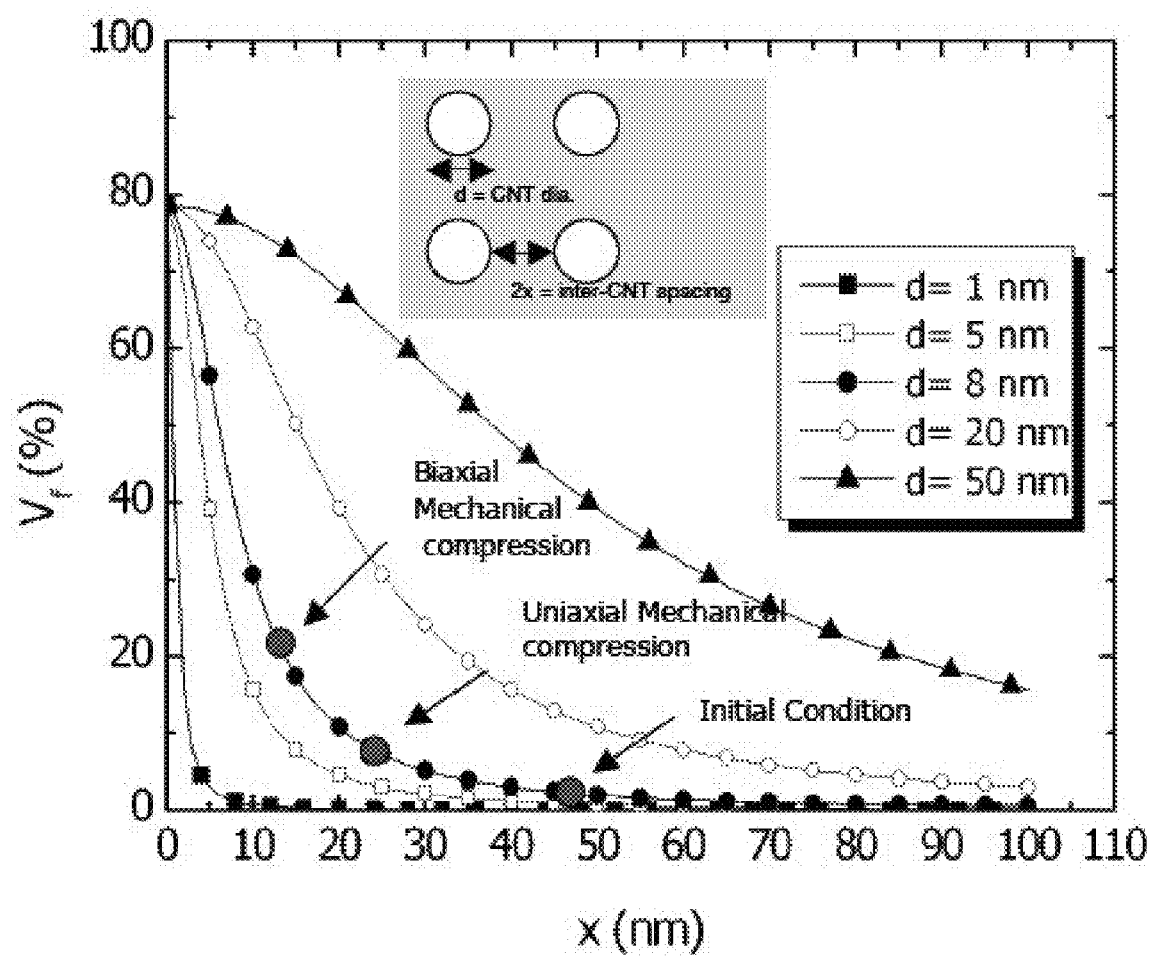
FIG. 7 includes a plot of volume fraction as a function of inter-nanostructure spacing, according to one set of embodiments.

In the A-CNT NCs considered here, the capillarity-driven wetting and the aligned nature of the CNTs can cause polymer packing and may induce polymer changes as well. Indeed, at high volume fractions and for small-diameter CNTs, as used in this work, inter-CNT spacing can approach the values of the interface region and the radius of gyration of polymers as shown in FIG. 7. Considering the size of the interphase on the order of 10-100 nm, up to 100% of the polymer volume fraction would be interphase, and if a distance equal to the polymer radius of gyration is needed between adjacent CNTs, then high volume fractions can be difficult to achieve for small dia. CNTs. Thermoplastics are generally known to be more susceptible to crystallization effects of additives than thermosets. Here we use wide-angle x-ray scattering (WAXS) to interrogate A-CNT NCs with regard to changes in the polymer induced by the CNTs.

Figure 8A:
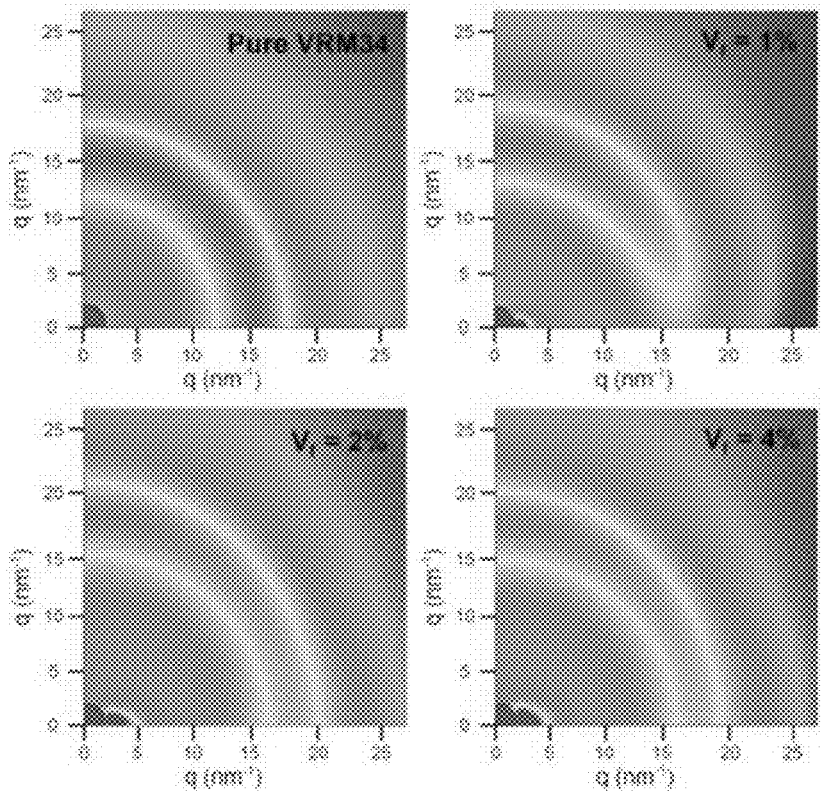
FIGS. 8A-8B include (A) WAXS image of a nanostructure composite and (B) integrated intensity profiles, according to one set of embodiments.
Figure 8B:
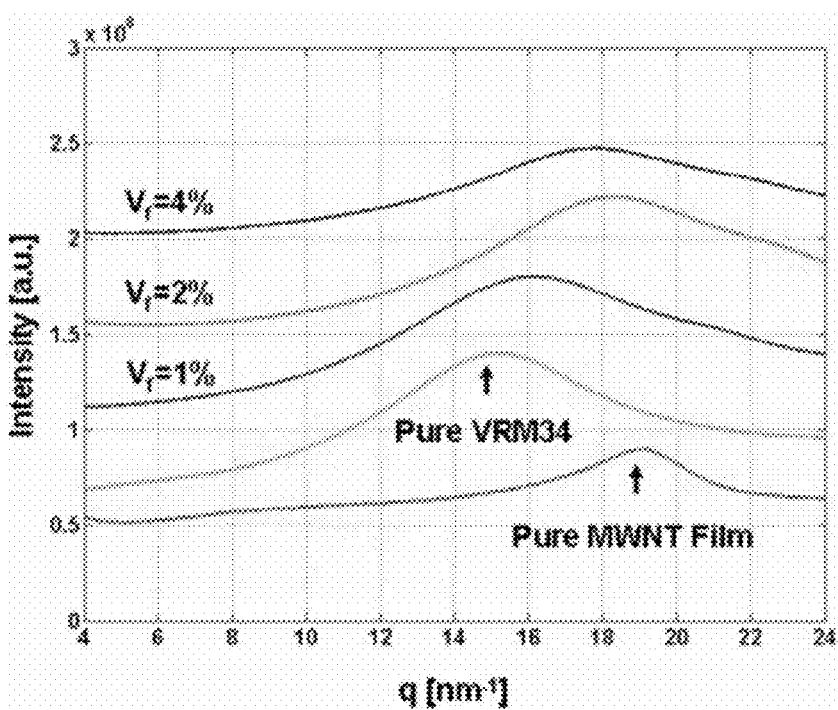

Wide-angle x-ray scattering was also performed, using the same setup as SAXS yet with a much shorter sample-detector distance for capturing a wider scattering angle. WAXS was used to examine features on the sub-nm scale (q=2π/d). WAXS data for a pure A-CNT forest, pure VRM34 thermoset, and A-CNT NCs with $V_f$=1, 2, and 4% are shown in FIG. 8. The integrated intensity profiles (+/− 10° from horizontal) reveal two distinct peaks: the peak at q=14.2 nm$^{-1}$ in the pure VRM34 sample (see arrow on pure VRM34 plot in FIG. 8B) indicative of local packing among polymer chains, and the peak at 19.2 nm$^{-1}$ in the as-grown CNT forest sample (see arrow on pure MWNT plot in FIG. 8B) representing the CNT interlayer spacing (d=0.34 nm). There was no indication of any induced crystallinity or preferential orientation of the polymer due to the addition of the CNTs. Similar behavior was observed for all other thermoset composites considered. The CNT and polymer peaks were convoluted at low $V_f$, and scattering from the CNT walls dominated the intensity at higher volume fractions.

Example 2

This example describes a series of experiments in which electrical and mechanical properties of nanocomposites were determined. RTM 6 (Hexcel) was used as the polymeric material for the nanocomposites in this example. Aligned-CNT polymer nanocomposites (A-CNT NCs) were produced according to the procedures outlined above. The cured A-CNT NC samples were machined and mechanically polished to achieve a smooth surface for characterization. As a result of the polishing and base-growth CNT processes, substantially no Fe catalyst was present in the specimens. Thermogravimetric analysis (TGA) indicated that the forests contained less than 10% amorphous carbon, which can be deposited on the CNT sidewalls from the hydrocarbon atmosphere during growth. Volume fractions for all samples were assessed by volumetric calculations. The A-CNT NCs samples were fabricated at 1%, 8%, and 20% volume fractions.

In addition, randomly-oriented CNT polymer nanocomposites (R-CNT NCs) were produced for the sake of comparison. R-CNT NCs were fabricated by mixing a CNT forest with the RTM 6 epoxy resin. The mixture was placed between two Teflon plates that were sheared by hand for 10 min. After 10 min, the CNT/resin dispersion appeared homogeneous visually and was poured into a silicone mold with a spatula. The samples were cured and machined following the procedure indicated above for A-CNT NCs. Samples were fabricated with nanotube volume fractions of 0.5%, 1%, 2%, and 4%. 4% was the maximum volume fraction tested due to processing difficulties arising from viscosity increases due to the incorporation of CNTs in the polymer.

Both A-CNT NCs and R-CNT NCs were tested via standard nanoindentation methods for modulus extraction. To achieve consistent results, the surfaces were mechanically polished in three steps with particle roughness ranging from 5 microns down to 0.005 microns. Surfaces were inspected under an optical microscope before testing. The tests were performed using a Nanotest 600 nanomechanical testing system (Micro Materials, UK). The nanoindenter monitored and recorded the load and displacement, and was capable of measuring and applying loads and depths ranging from 10 mN to 20 N (resolution of about 100 nN) and up to 50 microns (resolution of about 0.1 nm). Tests were performed inside the nanoindenter's thermally insulated environmental chamber (25° C.±0.5° C., relative humidity 45%±2%) with a Berkovich-type indenter. In order to compare the results obtained for the unreinforced epoxy matrix and the nanocomposites, the test's parameters were held constant, including importantly for polymers loading and unloading rates (100 mN/s respectively). Depending on the sample sizes, 12-16 indents were applied over the surface of each sample with a spacing of 350 microns. The samples were mounted on an aluminum stub and indented to 30 microns. The surface quality of the indents was ensured by SEM inspection after testing, and the results were averaged. Good surface quality via the three step polishing method yielded highly repeatable (overlapping indentation curves) results. The load-displacement curves were analyzed to determine the modulus using the Oliver-Pharr theory (see W. C. Oliver and G. M. Pharr, "Measurement of hardness and elastic modulus by instrumented indentation: advances in understanding and refinements to methodology." *J Mater Res* 2004; 19:3-20, which is incorporated herein by reference), where the unloading curve was used to obtain the reduced modulus ($E_r$). The reduced modulus is related to the specimen modulus through the following equation for isotropic materials:

$$\frac{1}{E_r} = \frac{1-v^2}{E} + \frac{1-v_i^2}{E_i} \quad [1]$$

where E is the modulus of the sample, v is the Poisson's ratio normal to loading of the sample, $E_i$ is the indenter modulus, and $v_i$ is the indenter Poisson's ratio. The indenter was diamond with $E_i$=1141 GPa and $v_i$=0.07. v was assumed to be 0.3 due to the matrix (polymer) dominated response in this direction, and because this yielded the most conservative (lowest) calculation of modulus. Due to the aligned nature of the CNTs in most of the samples tested, the material was not isotropic and therefore when using the Oliver-Pharr theory and Eq. (1), the extracted modulus is referred to here as an effective modulus.

Since the modulus of a composite is a function of the fiber and matrix properties and their interaction, it was of interest to determine the reinforcing effect by comparing A-CNT NCs and R-CNT NCs at different volume fractions as is typically performed in fibrous composite characterization. When discussing the modulus of a hollow MWNT, the approach taken in this example follows the practice of using the "engineering" modulus based on the total MWNT cross-sectional area (see Yu M F, Lourie O, Dyer M J, et al. "Strength and breaking mechanism of multiwalled carbon nanotubes under tensile load," *Science* 2000; 287:637-40, which is incorporated herein by reference) conservatively calculating the CNT NC modulus due to the use of the entire cross-sectional area of the CNT, rather than only the area of the outer CNT wall. The mechanical tests of nanocomposites were performed using standard nanoindentation loading-unloading curves and the effective elastic modulus (E) of the samples was obtained, using assumptions that give the most conservative calculation, as previously described.

Figure 9A:
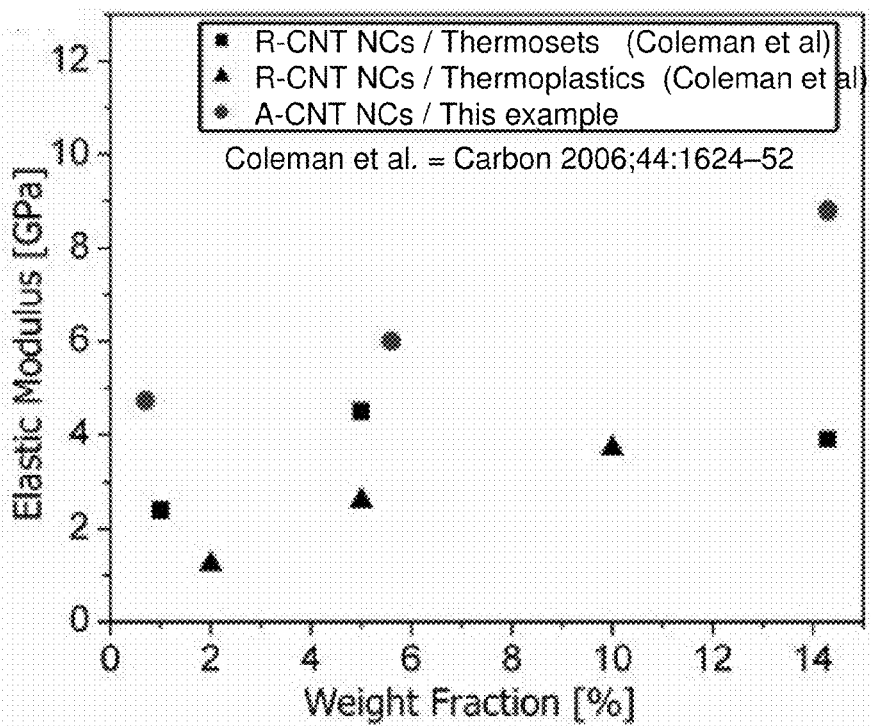
FIGS. 9A-9B include exemplary plots of (A) elastic modulus as a function of weight fraction of carbon nanotubes in nanocomposites, and (B) elastic modulus as a function of volume fraction of carbon nanotubes in nanocomposites, for one set of embodiments.
Figure 9B:
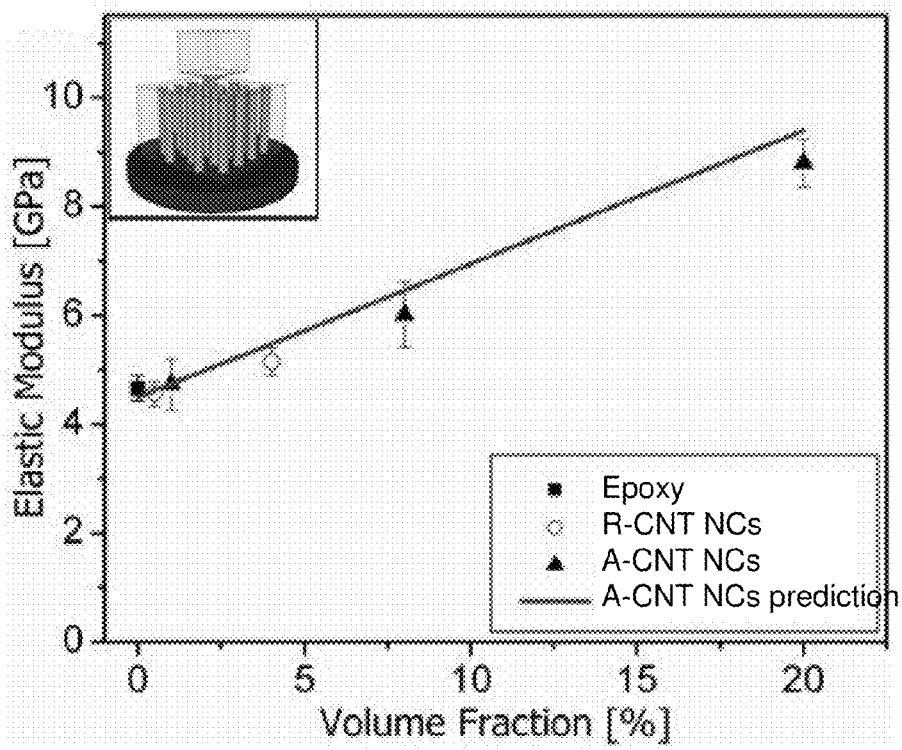

A linear trend in modulus was observed (see FIGS. 9A-9B) with increasing volume fraction of A-CNT NC s from the baseline epoxy. Modulus values of A-CNT NCs in FIG. 9A were relatively high, perhaps due to the CNT alignment at all volume fractions (for comparison with literature all the volume fraction values are converted to weight fractions in FIG. 9A). Further, at high volume fraction, the modulus trend continued linearly. On the other hand, for the extant data (FIG. 9A), the modulus increase fell off at high volume fractions, which may have been due to relatively poor dispersion. The modulus of the 20 vol % A-CNT NC was about 8.8 GPa.

Figure 10A:
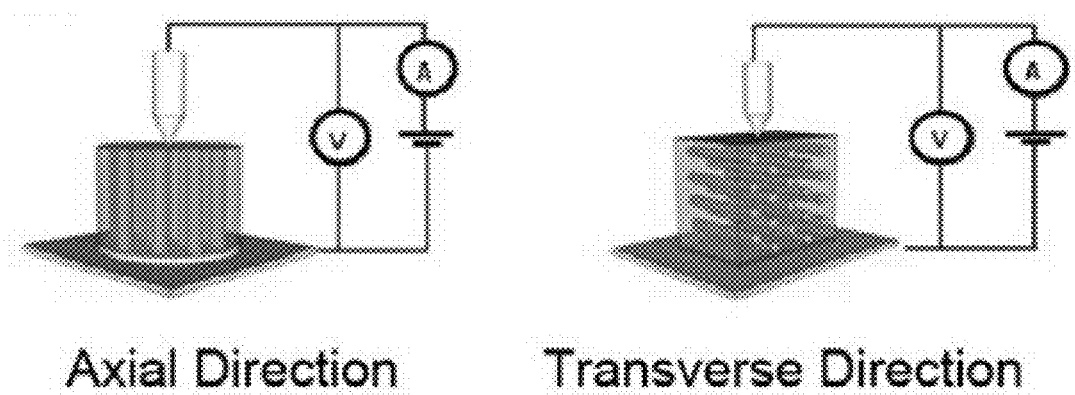
FIGS. 10A-10D include (A) an exemplary schematic diagram outlining electrical conductivity measurement, (B-C) exemplary plots of electrical conductivity as a function of volume fraction of carbon nanotubes in nanocomposites, and (D) an exemplary plot of current density as a function of electric field, according to one set of embodiments.

A-CNT NC and R-CNT NC samples were measured for DC electrical resistivity in a double 2-probe configuration (see FIG. 10A). For A-CNT NCs, the bulk volume conductivity was measured in two directions, axial and transverse. Different sample sets for various volume fractions were used for transverse and axial directions. In the case of R-CNT NCs, and the axial direction of A-CNT NCs, samples were small cylinders of 3-4 mm diameter by 1 mm length. For the transverse direction, the samples were 2 mm wide×2 mm high×1 mm long. Two opposite surfaces were used as contacts having silver-paint electrodes applied after being polished. One of these contacts was attached to a polished copper plate with silver paste. To measure the conductivity, the sample was placed on an automated stage, where the three axes were controlled. One metal probe was placed on the copper plate and the other on the bottom surface using the micro stage. A power supply (model HY 3005) and a voltammeter (HP 34401) were connected in parallel to the probes, in order to record the applied intensity and the difference of potential between the electrodes of the sample. The NC surface temperature was measured with a thermal camera (PCE Group-TC3) supported by a tripod. The resistivity was calculated from the slope of the I-V curve normalized by the dimensions of the samples for intensities lower than about 0.5 A/cm$^2$, so that the sample temperature was always less than 75° C. At least two different samples were measured for each reported conductivity value, with multiple measurements per sample performed. For consistency of measurements, the current was monitored until the temperature stabilized, and measurement was taken at least one minute after this stabilization.

Figure 10B:
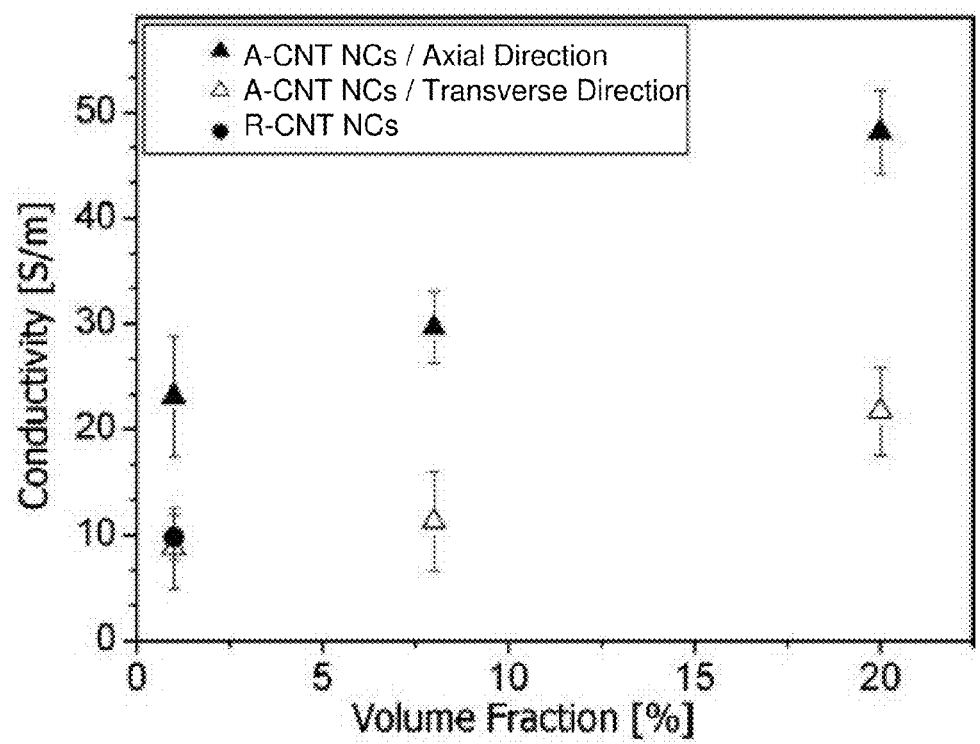
Figure 10C:
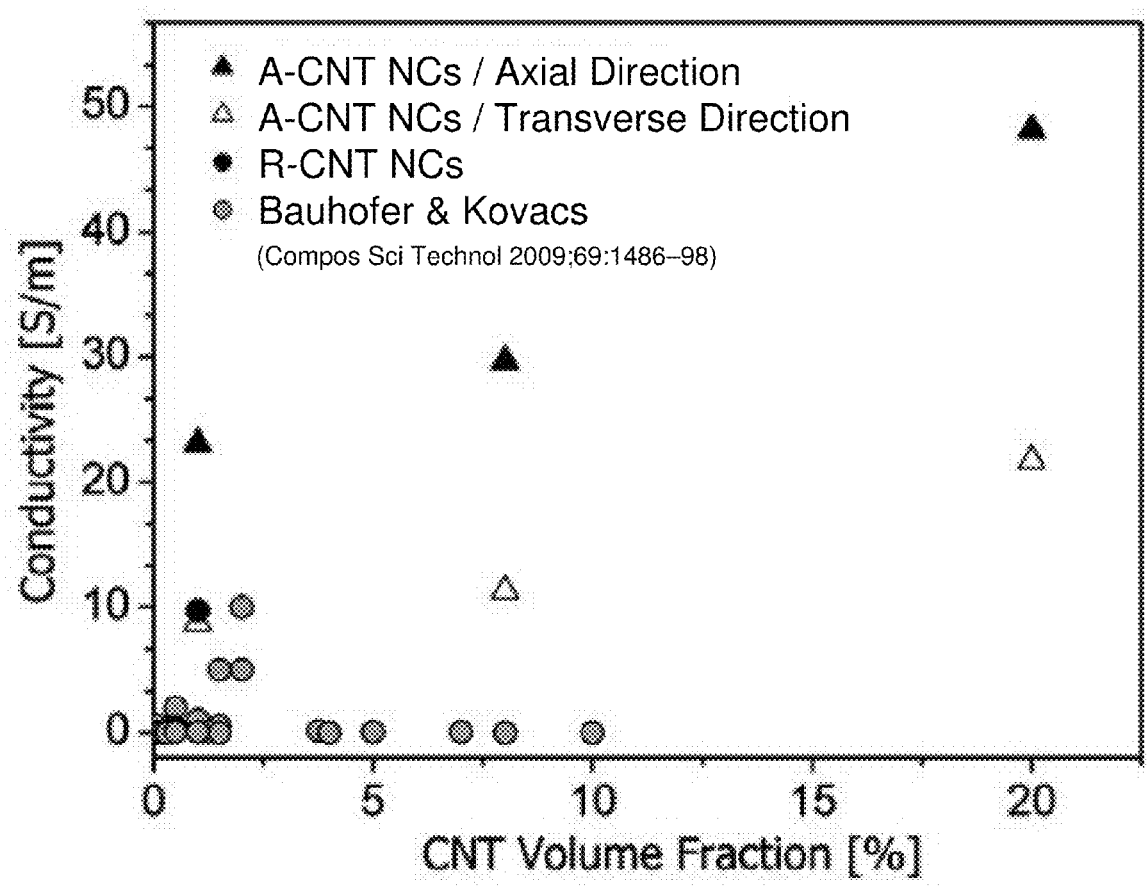
Figure 10D:
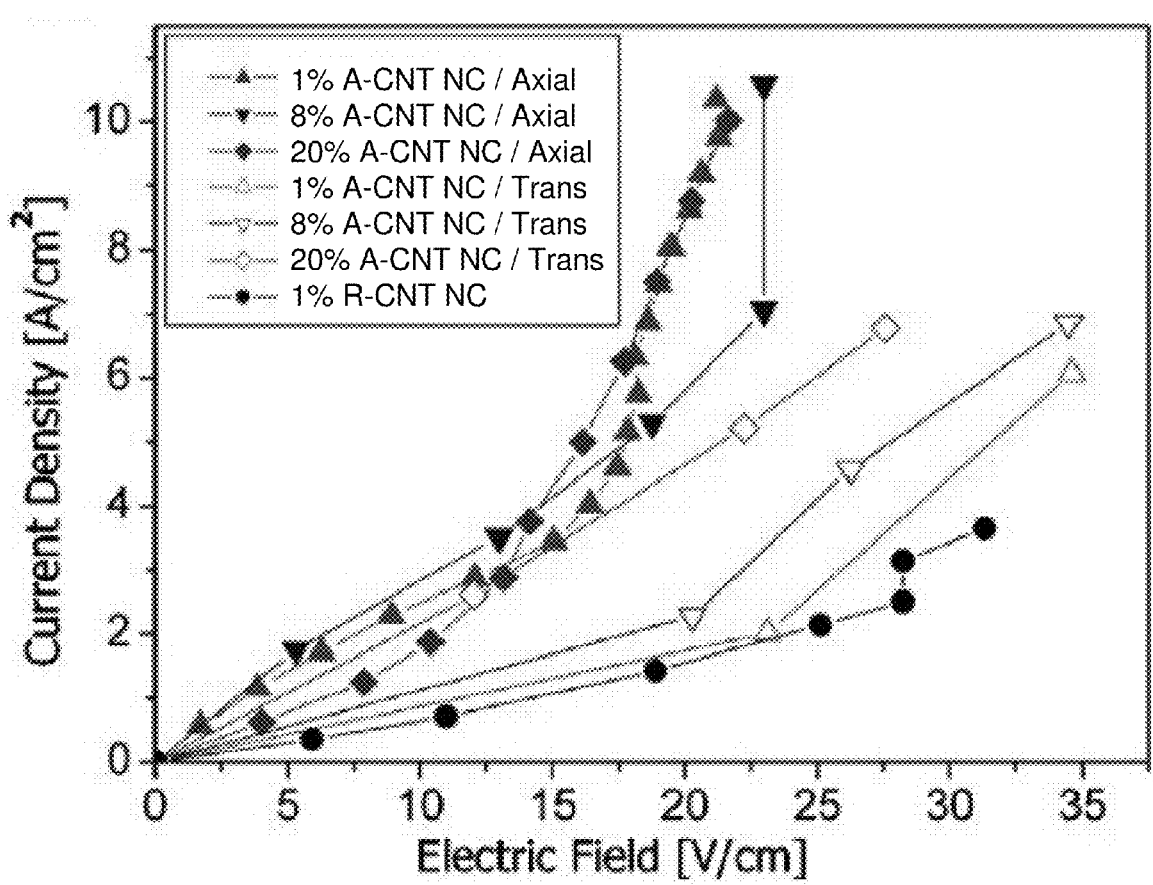

The addition of conductive particles to an insulating polymer can result in an electrically conductive composite if the particle concentration exceeds the percolation threshold, which generally refers to the particle volume fraction required to form a conductive network through the bulk polymer. Here, at 1% CNT volume fraction, it was expected that conductivity in all directions was beyond the percolation threshold. In particular, no percolation threshold was expected along the CNT NC axis due to the continuous aligned-CNTs. Direction-dependent volume (not surface converted to bulk) resistance was measured in the axial and transverse directions as shown in FIG. 10A, and used to calculate volume conductivity via the current density and electric field relationship $J=\sigma E$. In the axial direction, continuous CNTs spanned the samples, leading to higher conductivity than in the transverse direction, e.g., for the 1% $V_f$ A-CNT NC, conductivity was 23 S/m and 8.2 S/m for the axial and transverse directions, respectively (see FIG. 10B). In the transverse direction, CNT waviness and entanglement may have created a conductive path similar to percolation through the insulating epoxy. Increasing the volume fraction of aligned CNTs in the composites increased the number of conductive paths, which increased the conductivity linearly (see FIG. 10B). Consistent with the R-CNT NC morphology, the measured conductivity of 10 S/m for 1% $V_f$ R-CNT NC was between the values of the A-CNT NC in the axial and transverse directions. FIGS. 10C-10D include additional data outlining electrical conductivity experiments.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article comprising a plurality of elongated nanostructures wherein:
   the long axes of the elongated nanostructures are substantially aligned relative to each other;
   each elongated nanostructure is positioned relative to an adjacent elongated nanostructure at a distance so as to together define an average distance between adjacent elongated nanostructures;
   the plurality of elongated nanostructures extends a distance at least 10 times greater than the average distance between adjacent elongated nanostructures in each of two orthogonal directions each perpendicular to the long axes; and
   the volume fraction of the elongated nanostructures within the article is at least about 5%.

2. The article of claim 1, wherein the elongated nanostructures comprise carbon-based nanostructures.

3. The article of claim 2, wherein the carbon-based elongated nanostructures comprise carbon nanotubes.

4. The article of claim 1, further comprising a solid support material between the elongated nanostructures.

5. The article of claim 4, wherein the support material comprises a monomer.

6. The article of claim 4, wherein the support material comprises a polymer.

7. The article of claim 4, wherein the support material comprises a fiber.

8. The article of claim 4, wherein the support material comprises a ceramic.

9. The article of claim 4, wherein the support material comprises a metal.

10. The article of claim 1, wherein the average distance between the elongated nanostructures is less than about 80 nm.

11. The article of claim 1, wherein the volume fraction of the elongated nanostructures within the article is at least about 10%.

12. The article of claim 1, wherein the volume fraction of the elongated nanostructures within the article is at least about 20%.

13. The article of claim 1, wherein the volume fraction of the elongated nanostructures within the article is at least about 40%.

14. The article of claim 1, wherein the volume fraction of the elongated nanostructures within the article is at least about 60%.

15. The article of claim 1, wherein the volume fraction of the elongated nanostructures within the article is at least about 70%.

16. The article of claim 1, wherein the volume fraction of the elongated nanostructures within the article is at least about 75%.

17. The article of claim 1, wherein the volume fraction of the elongated nanostructures within the article is at least about 78%.

18. The article of claim 1, wherein the elongated nanostructures comprise nanotubes.

19. The article of claim 1, wherein the elongated nanostructures comprise nanofibers.

20. The article of claim 1, wherein the elongated nanostructures comprise nanowires.

21. The article of claim 1, wherein the plurality of elongated nanostructures extends a distance at least 100 times greater than the average distance between adjacent elongated nanostructures in each of two orthogonal directions each perpendicular to the long axes.

22. The article of claim 1, wherein the plurality of elongated nanostructures extends a distance at least 1000 times greater than the average distance between adjacent elongated nanostructures in each of two orthogonal directions each perpendicular to the long axes.

23. The article of claim 1, wherein the elongated nanostructures have an average diameter of 75 nm or less.

24. The article of claim 1, wherein the elongated nanostructures have an average diameter of 50 nm or less.

25. The article of claim 1, wherein the elongated nanostructures have an average diameter of 25 nm or less.

26. The article of claim 1, wherein the elongated nanostructures have an average diameter of 10 nm or less.

27. The article of claim 1, wherein the average distance between the elongated nanostructures is less than about 60 nm.

28. The article of claim 1, wherein the average distance between the elongated nanostructures is less than about 40 nm.

29. The article of claim 1, wherein the average distance between the elongated nanostructures is less than about 30 nm.

30. The article of claim 1, wherein the average distance between the elongated nanostructures is less than about 20 nm.

31. The article of claim 1, wherein the average distance between the elongated nanostructures is less than about 10 nm.

32. The article of claim 1, wherein the average distance between the elongated nanostructures is less than about 5 nm.

* * * * *

UNITED STATES PATENT AND TRADEMARK OFFICE
CERTIFICATE OF CORRECTION

| | |
|---|---|
| PATENT NO. | : 9,771,264 B2 |
| APPLICATION NO. | : 12/618203 |
| DATED | : September 26, 2017 |
| INVENTOR(S) | : Garcia et al. |

Page 1 of 1

It is certified that error appears in the above-identified patent and that said Letters Patent is hereby corrected as shown below:

In the Specification

In Column 1, Line 23, after paragraph "RELATED APPLICATIONS" insert heading & paragraph:
--GOVERNMENT SUPPORT
This invention was made with government support under DMI0521985 awarded by the National Science Foundation. The government has certain rights in the invention.--

Signed and Sealed this
Eighteenth Day of November, 2025

John A. Squires
*Director of the United States Patent and Trademark Office*